(12) United States Patent
Shirazi

(10) Patent No.: US 11,669,905 B2
(45) Date of Patent: *Jun. 6, 2023

(54) FRESH WATER PRICE INDEX BASED ON WATER QUALITY

(71) Applicant: AQUA INDEX ltd., Petach Tikva (IL)

(72) Inventor: Yaacov Shirazi, Petach Tikva (IL)

(73) Assignee: AQUA INDEX LTD., Petach Tikva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/134,415

(22) Filed: Dec. 27, 2020

(65) Prior Publication Data

US 2021/0118057 A1 Apr. 22, 2021

Related U.S. Application Data

(63) Continuation of application No. 13/462,129, filed on May 2, 2012, now Pat. No. 10,909,624.

(51) Int. Cl.
*G06Q 40/06* (2012.01)
(52) U.S. Cl.
CPC ................... *G06Q 40/06* (2013.01)
(58) Field of Classification Search
None
See application file for complete search history.

(56) References Cited

U.S. PATENT DOCUMENTS

| | | | |
|---|---|---|---|
| 2009/0055294 A1* | 2/2009 | Shirazi | G06Q 20/10 705/37 |
| 2011/0017678 A1* | 1/2011 | Anderson | E03B 1/042 210/138 |

* cited by examiner

*Primary Examiner* — Namrata Boveja
*Assistant Examiner* — Liz P Nguyen
(74) *Attorney, Agent, or Firm* — Mark M. Friedman

(57) ABSTRACT

A method and system for computing a stable index value of fresh water based on water quality category and/or grade from current values of root commodities (i.e. freely marketed products) that either have fresh water as a constituent and/or utilize fresh water in their production, usable to develop a stable investment instrument for investing in fresh water. A processor may process associations between a root commodity and a water quality category of fresh water. A display associated with a computer may display updateable current prices of fresh water of a particular water quality category and/or grade and updateable current prices of one or more root commodities. A water measurement device may measure at least one water source of fresh water with respect to at least one of TDS, carbonate content, pH, hardness, sodium, chloride, nitrate, toxins and sodium adsorption ratio and compare against standards to categorize the fresh water.

41 Claims, 10 Drawing Sheets

METHOD 100

DETERMINING, USING A COMPUTER PROCESSOR, CURRENT PRICES OF AT LEAST ONE ROOT COMMODITY OTHER THAN WATER, EACH ROOT COMMODITY IN THE AT LEAST ONE ROOT COMMODITY HAVING AT LEAST ONE OF (I) WATER AS A CONSTITUENT IN SAID EACH ROOT COMMODITY AND (II) WATER UTILIZED IN PRODUCTION OF SAID EACH ROOT COMMODITY — 110

↓

MATCHING EACH OF AT LEAST ONE WATER QUALITY CATEGORY WITH EACH ROOT COMMODITY OF THE AT LEAST ONE ROOT COMMODITY SUCH THAT A QUALITY OF WATER USED IN PRODUCTION OF A RESPECTIVE ROOT COMMODITY MEETS WATER QUALITY STANDARDS OF A RESPECTIVE WATER QUALITY CATEGORY — 120

↓

DETERMINING, USING A COMPUTER PROCESSOR, FOR EACH WATER QUALITY CATEGORY OF THE AT LEAST ONE WATER QUALITY CATEGORY, A CURRENT INDEX VALUE FOR FRESH WATER MEETING SAID EACH WATER QUALITY CATEGORY, THE INDEX VALUE DETERMINED BASED ON A CURRENT PRICE OF SAID EACH ROOT COMMODITY THAT WAS MATCHED WITH SAID EACH WATER QUALITY CATEGORY AND BASED ON AT LEAST ONE OF (I) A QUANTITY OF FRESH WATER CONSTITUENT IN SAID EACH ROOT COMMODITY THAT WAS MATCHED WITH SAID EACH WATER QUALITY CATEGORY AND (II) A QUANTITY OF FRESH WATER USED IN PRODUCTION OF SAID EACH ROOT COMMODITY THAT WAS MATCHED WITH SAID EACH WATER QUALITY CATEGORY — 130

FIG. 1

METHOD 200

210 — DETERMINING, USING A COMPUTER PROCESSOR, CURRENT PRICES OF AT LEAST ONE ROOT COMMODITY OTHER THAN WATER, EACH ROOT COMMODITY OF THE AT LEAST ONE ROOT COMMODITY HAVING AT LEAST ONE OF (I) WATER AS A CONSTITUENT IN SAID EACH ROOT COMMODITY AND (II) WATER UTILIZED IN PRODUCTION OF SAID EACH ROOT COMMODITY

↓

220 — MATCHING EACH OF AT LEAST ONE WATER QUALITY CATEGORY WITH EACH ROOT COMMODITY OF THE AT LEAST ONE ROOT COMMODITY SUCH THAT A QUALITY OF WATER THAT IS CONSTITUENT IN A RESPECTIVE ROOT COMMODITY MEETS WATER QUALITY STANDARDS OF A RESPECTIVE WATER QUALITY CATEGORY

↓

230 — DETERMINING, USING A COMPUTER PROCESSOR, FOR EACH WATER QUALITY CATEGORY OF THE AT LEAST ONE WATER QUALITY CATEGORY, A CURRENT INDEX VALUE FOR FRESH WATER MEETING SAID EACH WATER QUALITY CATEGORY, THE INDEX VALUE DETERMINED BASED ON A CURRENT PRICE OF SAID EACH ROOT COMMODITY THAT WAS MATCHED WITH SAID EACH WATER QUALITY CATEGORY AND BASED ON AT LEAST ONE OF (I) A QUANTITY OF FRESH WATER CONSTITUENT IN SAID EACH ROOT COMMODITY THAT WAS MATCHED WITH SAID EACH WATER QUALITY CATEGORY AND (II) A QUANTITY OF FRESH WATER USED IN PRODUCTION OF SAID EACH ROOT COMMODITY THAT WAS MATCHED WITH SAID EACH WATER QUALITY CATEGORY

FIG. 2

METHOD 800

DETERMINING, USING A COMPUTER PROCESSOR, A PRICE OF EACH OF THE FINANCIAL INSTRUMENTS IDENTIFYING ON ITS FACE A PARTICULAR AMOUNT OF FRESH WATER OF A PARTICULAR WATER QUALITY CATEGORY, THE PRICE OF EACH FINANCIAL INSTRUMENT DETERMINED USING AN INDEX VALUE OF FRESH WATER OF A PARTICULAR WATER QUALITY CATEGORY ⎱810

HAVING A COMPUTER STORE WATER QUALITY STANDARDS FOR AT LEAST ONE WATER QUALITY CATEGORY ⎱820

DETERMINING, USING A COMPUTER PROCESSOR, CURRENT PRICES OF AT LEAST ONE ROOT COMMODITY OTHER THAN WATER, EACH ROOT COMMODITY OF THE AT LEAST ONE ROOT COMMODITY HAVING AT LEAST ONE OF (I) WATER AS A CONSTITUENT IN SAID EACH ROOT COMMODITY AND (II) WATER UTILIZED IN PRODUCTION OF SAID EACH ROOT COMMODITY ⎱830

ASSOCIATING EACH WATER QUALITY CATEGORY OF THE AT LEAST ONE WATER QUALITY CATEGORY WITH A ROOT COMMODITY OF THE AT LEAST ONE ROOT COMMODITY SUCH THAT A QUALITY OF WATER EITHER (I) CONSTITUENT IN A RESPECTIVE ROOT COMMODITY OR (II) USED IN PRODUCTION OF THE RESPECTIVE ROOT COMMODITY, MEETS WATER QUALITY STANDARDS OF A RESPECTIVE WATER QUALITY CATEGORY ⎱840

DETERMINING, USING A COMPUTER PROCESSOR, FOR EACH WATER QUALITY CATEGORY OF THE AT LEAST ONE WATER QUALITY CATEGORY, THE INDEX VALUE FOR FRESH WATER MEETING SAID EACH WATER QUALITY CATEGORY, THE INDEX VALUE DETERMINED BASED ON A CURRENT PRICE OF SAID EACH ROOT COMMODITY ASSOCIATED WITH SAID EACH WATER QUALITY CATEGORY AND BASED ON AT LEAST ONE OF (I) A QUANTITY OF FRESH WATER CONSTITUENT IN SAID EACH ROOT COMMODITY ASSOCIATED WITH SAID EACH WATER QUALITY CATEGORY AND (II) A QUANTITY OF FRESH WATER USED IN PRODUCTION OF SAID EACH ROOT COMMODITY ASSOCIATED WITH SAID EACH WATER QUALITY CATEGORY ⎱850

FIG. 3

METHOD 400

DETERMINING, USING A COMPUTER PROCESSOR, CURRENT PRICES OF AT LEAST ONE ROOT COMMODITY, ROOT COMMODITIES BEING OTHER THAN WATER, EACH ROOT COMMODITY IN THE AT LEAST ONE ROOT COMMODITY HAVING AT LEAST ONE OF (I) WATER AS A CONSTITUENT IN SAID EACH ROOT COMMODITY AND (II) WATER UTILIZED IN PRODUCTION OF SAID EACH ROOT COMMODITY ⎯410

↓

ASSOCIATING EACH OF AT LEAST ONE WATER QUALITY CATEGORY WITH AT LEAST ONE ROOT COMMODITY OF THE AT LEAST ONE ROOT COMMODITY, THE AT LEAST ONE WATER QUALITY CATEGORY DEFINED BY FALLING WITHIN A RANGE WITH REGARD TO AT LEAST ONE OF TDS, CARBONATE CONTENT, PH, HARDNESS, SODIUM, CHLORIDE, NITRATE, TOXINS AND SODIUM ADSORPTION RATIO ⎯420

↓

DETERMINING, USING A COMPUTER PROCESSOR, FOR EACH WATER QUALITY CATEGORY OF THE AT LEAST ONE WATER QUALITY CATEGORY, A CURRENT INDEX VALUE FOR FRESH WATER MEETING SAID EACH WATER QUALITY CATEGORY, THE INDEX VALUE DETERMINED BASED ON A CURRENT PRICE OF SAID EACH ROOT COMMODITY THAT WAS ASSOCIATED WITH SAID EACH WATER QUALITY CATEGORY AND BASED ON AT LEAST ONE OF (I) A QUANTITY OF FRESH WATER CONSTITUENT IN SAID EACH ROOT COMMODITY THAT WAS ASSOCIATED WITH SAID EACH WATER QUALITY CATEGORY AND (II) A QUANTITY OF FRESH WATER USED IN PRODUCTION OF SAID EACH ROOT COMMODITY THAT WAS ASSOCIATED WITH SAID EACH WATER QUALITY CATEGORY ⎯430

FIG. 4

FRESH WATER PRICE INDEX BASED ON WATER QUALITY

FIELD AND BACKGROUND OF THE INVENTION

The present invention relates to systems and methods for making a stable price of fresh water and financial instruments using such price and more particularly, to systems and methods where the price or index value of fresh water is based on the water quality.

Fresh water is an essential and irreplaceable commodity that is becoming scarcer. Fresh water is also a very desirable commodity for investment. Investment money is needed for protecting, purifying and distributing water. On the other hand, the market for water is strongly affected by local and temporal factors and prices vary wildly. In order to invest safely in water an investor needs additional protection.

It is important that the water market take into account water quality. This is true from rational economic point of view of investors—the true value of water strongly depends on the water quality. It is also true from a more idealistic conversationalist point of view because in order to increase the incentive to protect water quality, it is necessary that the value of water for holders reflects its quality.

A few factors make developing a rational price index for water different from and more difficult than other commodities. First, water is a highly regulated commodity and its price often does not reflect its true market value. Secondly, water is an essential element in a vast number of different processes. Different aspects of water quality of differing effect on its value for the different uses.

Concerning the first difficulty, it has already been pointed out in U.S. Pat. No. 8,024,239 to Inventor Shirazi (Title: Aqua Index) issued Sep. 20, 2011 (hereinafter "Shirazi '239 patent"), which patent is hereby incorporated by reference in its entirety, that the political and economic importance of water limits the potential of trade as a policy tool to mitigate water scarcity. National and local governments use exit tees, fixed taxing and progressive taxing of water on one hand, and subsidization of water on the other hand to protect local water supplies or encourage water intensive industries (like agriculture). Water has a wide range of prices (e.g. 0.16-4.00 usd/m3) and exit fees (e.g. 0-70% in different provinces in Australia), and tax rates (e.g. 10-50% progressive tax and 30% subsidization for agriculture in Israel). As a result, no one has been able to build a stable international market for water.

Concerning the second problem, it has been pointed out by the Tennessee Water Control Board (see Rules of Tennessee Dept. of Environment and Conservation Division of Water Pollution Control, Chapter 1200-4-1, http://tn.gov/sos/rules/1200/1200-04/1200-04-01.pdf) that water has many uses, which in the public interest are reasonable and necessary. Such uses include sources of water supply for domestic and industrial purposes; propagation and maintenance of fish and other aquatic life; recreation in and on the waters including the safe consumption of fish and shellfish; livestock watering and irrigation; navigation; generation of power; propagation and maintenance of wildlife; and the enjoyment of scenic and aesthetic qualities of waters. The rigid application of uniform water quality is not desirable or reasonable because of the varying uses of such waters.

Therefore, to develop a unified price index for water as a commodity requires consideration of aspects of use and interaction of quality factors and uses in a way that is different from any other commodity.

One cannot just define certain "good" and "bad" aspects of water quality and assign points (like is done in other commodities). This is stated dearly for example by the FAO (Food and Agriculture organization of the United Nations):

Conceptually, water quality refers to the characteristics of a water supply that will influence its suitability for a specific use, i.e. how well the quality meets the needs of the user. Quality is defined by certain physical, chemical and biological characteristics. Even a personal preference such as taste is a simple evaluation of acceptability. For example, if two drinking waters of equally good quality are available, people may express a preference for one supply rather than the other; the better tasting water becomes the preferred supply. In irrigation water evaluation, emphasis is placed on the chemical and physical characteristics of the water and only rarely are any other factors considered important.

Specific uses have different quality needs and one water supply is considered more acceptable (of better quality) if it produces better results or causes fewer problems than an alternative water supply. For example, good quality river water which can be used successfully for irrigation may, because of its sediment load, be unacceptable for municipal use without treatment to remove the sediment. Similarly, snowmelt water of excellent quality for municipal use may be too corrosive for industrial use without treatment to reduce its corrosion potential. Obviously one cannot just define uses of water and make the value a weighted average of the value for each use since this would penalize a water that is fit for drinking if it was also fit for agriculture. In reality, due to the vast difference in quantitative demand, it is sometimes advantageous to sell drinking quality water to agriculture.

There is therefore a compelling need to have a stable price for fresh water that is based on water quality and to have financial instruments based on such a price.

SUMMARY OF THE PRESENT INVENTION

One aspect of the present invention is a method for investing in fresh water based on a quality of the fresh water, comprising (a) determining, using a computer processor, current prices of at least one root commodity other than water, each root commodity of the at least one root commodity having at least one of (i) water as a constituent in said each root commodity and (ii) water utilized in production of said each root commodity; (b) matching each of at least one water quality category with each root commodity of the at least one root commodity such that a quality of water used in production of a respective root commodity meets water quality standards of a respective water quality category; and (c) determining, using a computer processor, for each water quality category of the at least one water quality category, a current index value for fresh water meeting said each water quality category, the index value determined based on a current price of said each root commodity that was matched with said each water quality category and based on at least one of (i) a quantity of fresh water constituent in said each root commodity that was matched with said each water quality category and (ii) a quantity of fresh water used in production of said each root commodity that was matched with said each water quality category.

A preferred embodiment of this method involves measuring at least one water source having fresh water with respect to at least one of TDS, carbonate content, pH, hardness, sodium, chloride, nitrate, toxins and sodium adsorption ratio to categorize the fresh water of the at least one water source by one or more of (i) water quality category and (ii) water quality grade.

A further preferred embodiment involves displaying on a display associated with a computer an updateable current price of one or more root commodities and an updateable current price of fresh water of a particular (i) water quality category, (ii) water quality grade or (iii) water quality category and water quality grade, the current price of the fresh water of the particular water quality being dependent on the current price of the one or more root commodities.

A further preferred embodiment involves displaying on a first portion of a display associated with a computer one or more current index values for fresh water and an indicia identifying either water or a category of fresh water whose current index value is displayed on the first portion, the display also displaying on a second portion of the display a current price of at least one root commodity from which the at least one of the current index values is derived and an indicia identifying the at least one root commodity whose current price is displayed on the second portion.

A still further preferred embodiment involves updating over time and making accessible to the public a displayed at least one of the current index values and updating over time and making available to the public a displayed current price of the at least one root commodity.

A further preferred embodiment involves determining, using a processor, a price of fresh water derived from a particular water source by determining a current level of suitability of fresh water derived from the particular water source for each of the plurality of water quality categories and by combining current index values of the fresh water of each water quality categories by weighting each index value being combined by (i) the determined current level of suitability of the fresh water from the particular water source for each of the plurality of water quality categories and by (ii) a market share of water from each water quality category.

A further aspect of the present invention is a method for investing in fresh water based on a quality of the fresh water, comprising (a) determining, using a computer processor, current prices of at least one root commodity other than water, each root commodity of the at least one root commodity having at least one of (i) water as a constituent in said each root commodity and (ii) water utilized in production of said each root commodity; (h) matching each of at least one water quality category with each root commodity of the at least one root commodity such that a quality of water that is constituent in a respective root commodity meets water quality standards of a respective water quality category; and (c) determining, using a computer processor, for each water quality category of the at least one water quality category, a current index value for fresh water meeting said each water quality category, the index value determined based on a current price of said each root commodity that was matched with said each water quality category and based on at least one of (i) a quantity of fresh water constituent in said each root commodity that was matched with said each water quality category and (ii) a quantity of fresh water used in production of said each root commodity that was matched with said each water quality category.

A preferred embodiment of this method comprises displaying on a display associated with a computer an updateable current price of one or more root commodities and an updateable current price of fresh water of a particular (i) water quality category, (ii) water quality grade Or (iii) water quality category and water quality grade, the current price of the fresh water of the particular water quality being dependent on the current price of the one or more root commodities.

A preferred embodiment of this method also comprises displaying on a first portion of a display associated with a computer one or more of the current index values for fresh water and an indicia, identifying either water or a category of fresh water, whose current index value is displayed on the first portion, the display also displaying on a second portion of the display a current price of at least one root commodity from which the at least one of the current index values is derived and an indicia identifying a root commodity whose current price is displayed on the second portion.

A still farther aspect of the present invention is a method of using financial instruments to invest in fresh water based of water quality, comprising determining, using a computer processor, a price of each of the financial instruments identifying on its face a particular amount of fresh water of a particular water quality category, the price of each financial instrument determined using an index value of fresh water of a particular water quality category, having a computer store water quality standards for at least one water quality category; determining, using a computer processor, current prices of at least one root commodity other than water, each root commodity of the at least one root commodity having at least one of (i) water as a constituent in said each root commodity and (ii) water utilized in production of said each root commodity; associating each water quality category of the at least one water quality category with a root commodity of the at least one root commodity such that a quality of water either (i) constituent in a respective root commodity or (ii) used in production of the respective root commodity, meets water quality standards of a respective water quality category; determining, using a computer processor, for each water quality category of the at least one water quality category, the index value for fresh water meeting said each water quality category, the index value determined based on a current price of said each root commodity associated with said each wafer quality category and based on at least one of (i) a quantity of fresh water constituent in said each root commodity associated with said each water quality category and (ii) a quantity of fresh water used in production of said each root commodity associated with said each water quality category.

One preferred embodiment of this method comprises displaying on a display associated with a computer an updateable current price of one or more root commodities and an updateable current price of fresh water of a particular (i) water quality category, (ii) water quality grade or (iii) water quality category and water quality grade, the current price of the fresh water of the particular water quality being dependent on the current price of the one or more root commodities.

One further preferred embodiment of this method is displaying on a first portion of a display associated with a computer at least one of the index values for fresh water, the display also displaying on a second portion of the display a price of at least one root commodity from which the at least one of the index values is derived, the at least one of the index values and the price of the at least one root commodity each being updated over time.

In some preferred embodiments, the method also comprises the water quality categories having standards specifying ranges for at least one of TDS, carbonate content, pH, hardness, sodium, chloride, nitrate, toxins and sodium adsorption ratio.

In some further preferred embodiments, the method also comprises the water quality categories having standards specifying ranges for TDS, carbonate content, pH, hardness, sodium, chloride, nitrate, toxins and sodium adsorption ratio.

In certain further preferred embodiments, the method also comprises using a specific body of fresh water as collateral for the amount of fresh water on the face of each of the financial instruments.

A still further aspect of the present invention is a system for trading fresh water based on water quality, comprising a computer for determining current prices of at least one root commodity other than water, each root commodity of the at least one root commodity having at least one of (i) water as a constituent and (ii) water utilized in production of the said each root commodity, storing water quality standards for at least one water quality category, processing associations between each of at least one water quality category with at least one root commodity of the at least one root commodity such that a quality of water used in production of the root commodity meets water quality standards of the respective water quality category; and determining a current index value for fresh water of each of the water quality categories based on a current price of said each root commodity and based on at least one of (i) a quantity of fresh water constituent in the root commodity associated with said each water quality category and (ii) a quantity of fresh water used in production of the root commodity.

The system, in some preferred embodiments, also comprises a display associated with a computer for displaying an updateable current price of one or more root commodities and an updateable current price of fresh water of a particular (i) water quality category, (ii) water quality grade or (iii) water quality category and water quality grade, such that the current price of the fresh water of the particular water quality is dependent on the current price of the one or more root commodities. In some further preferred embodiments, the system has a display associated with the computer for displaying one or more of the current index values for fresh water and an indicia identifying either water or a category of fresh water for each one of the current index value displayed on the first portion, the display also displaying a current price of at least one root commodity from which the at least one of the current index values is derived and an indicia identifying each of the at least one root commodity whose current price is displayed on the display. In other preferred embodiments, the system also includes a display associated with the computer for displaying on a first portion of the display one or more of the current index values for fresh water and an indicia identifying either water or a category of fresh water for each one of the current index value displayed on the first portion, the display also displaying on a second portion of the display a current price of at least one root commodity from which the at least one of the current index values is derived and an indicia identifying each of the at least one root commodity whose current price is displayed on the second portion.

Certain preferred embodiments of the system further comprise the at least one water quality category including at least one from (i) a first water quality category for water that meets minimal standards for either drinking or domestic use, (ii) a second water quality category for water that does not meet standards for drinking water but meets minimal standards for agricultural quality water and (iii) a third water quality category for water that does not meet standards for agricultural quality water or drinking water but meets minimal standards for industrial quality water.

In some preferred embodiments of the system, the water quality standards specify ranges for at least one of TDS, carbonate content, pH, hardness, sodium, chloride, nitrate, toxins and sodium adsorption ratio.

The system, in some preferred embodiments, also comprises a water quality measurement device for measuring fresh water from at least one water source that has fresh water, with respect to at least one of TDS, carbonate content, pH, hardness, sodium, chloride, nitrate, toxins and sodium adsorption ratio to categorize the fresh water of the at least one water source by water quality category.

In certain preferred embodiments of the system, the computer is also for determining a price of fresh water that comes from a particular water source by determining a current level of suitability of fresh water derived from the particular water source for each of the at least one water quality category and by combining current index values of the fresh water of each water quality categories by weighting each index value being combined by (i) the determined current level of suitability of the fresh water from the particular water source for each of the at least one water quality category and by (ii) a market share of water from each of the at least one water quality category.

A yet still further aspect of the present invention is a further system for trading fresh water based on water quality, comprising a computer for determining current prices of at least one root commodity other than water, each root commodity of the at least one root commodity having at least one of (i) water as a constituent in the root commodity and (ii) water utilized in production of the root commodity, storing water quality standards for at least one water quality category, determining and storing associations between each of at least one water quality category of the at least one water quality categories with at least one root commodity such that a quality of water constituent in a respective root commodity meets water quality standards of a respective water quality category; and determining a current index value for fresh water of each of the water quality categories based on a current price of said each root commodity and based on at least one of (i) a quantity of fresh water constituent in the root commodity associated with said each water quality category and (ii) a quantity of fresh water used in production of the root commodity.

The further system, in some preferred embodiments, includes a display associated with a computer for displaying an updateable current price of one or more root commodities and an updateable current price of fresh water of a particular (i) water quality category, (ii) water quality grade or (iii) water quality category and water quality grade, such that the current price of the fresh water of the particular water quality is dependent on the current price of the one or more root commodities. In some other preferred embodiments, the further system includes a display associated with the computer for displaying one or more of the current index values for fresh water and an indicia identifying either water or a category of fresh water for each one of the current index value displayed on the first portion, the display also displaying a current price of at least one root commodity from which the at least one of the current index values is derived and an indicia identifying each of the at least one root commodity whose current price is displayed on the display.

In preferred embodiments of the further system, the water quality standards specify ranges for at least one of TDS, carbonate content, pH, hardness, sodium, chloride, nitrate, toxins and sodium adsorption ratio.

Another aspect of the present invention is still further system for trading fresh water based on water quality, the system comprising at least one computer of at least one commodities exchange outputting prices of commodities that are not water, at least one of the commodities being a root commodity that either has fresh water as a constituent or whose production utilizes fresh water; a system computer having a processor, the system computer linked with and configured to receive from the at least one computer of the at least one commodities exchange updateable price data for the commodities, the system computer configured to identify root commodities and extract, from the updateable price data, the current price for said identified root commodities, the processor also configured to store water quality standards for at least one water quality category, associate each water quality category of the at least one water quality categories with at least one said identified root commodity such that a quality of water used in production of a respective identified root commodity meets water quality standards of a respective water quality category, compute, for each water quality category of the at least one water quality category, a current index value for fresh water meeting said each water quality category, the current index value determined based on a current price of said each identified root commodity associated with said each water quality category and based on at least one of (i) a quantity of fresh water constituent in said each identified root commodity associated with said each water quality category and (ii) a quantity of fresh water used in production of said each identified root commodity associated with said each water quality category, the system computer configured to transmit the computed current index value of each water quality category to the at least one computer.

Certain preferred embodiments of this still further system include a display associated with the at least one computer, the display displaying at least one current index value for fresh water of a water quality category and displaying a price of at least one identified root commodity from which the at least one current index value for fresh water is derived, the displayed at least one current index value for fresh water being updated over tune and the displayed price of the at least one identified root commodity being updated over time, Other preferred embodiments of this other system include a display associated with the at least one computer, the display displaying at least one current index value for fresh water of a water quality category in a first portion of the display and displaying a price of at least one identified root commodity from which the at least one current index value for fresh water is derived on a second portion of the display, the displayed at least one current index value for fresh water being updated over time and the displayed price of the at least one identified root commodity being updated over time.

The still further system may in certain preferred embodiments further comprise a computer processor for determining a price of each of a plurality of financial instruments identifying on its face a particular amount of fresh water of a particular water quality category, the price of each financial instrument determined using the current index value of fresh water for one water quality category.

A yet still further aspect of the present invention is a still further method for investing in fresh water based on a quality of the fresh water, comprising (a) determining, using a computer processor, current prices of at least one root commodity, root commodities being other than water, each root commodity of the at least one root commodity having at least one of (i) water as a constituent in said each root commodity and (ii) water utilized in production of said each root commodity; (b) associating each of at least one water quality category with at least one root commodity of the at least one root commodity, the at least one water quality category defined by falling within a range with regard to at least one of TDS, carbonate content, pH, hardness, sodium, chloride, nitrate, toxins and sodium adsorption ratio; and (c) determining, using a computer processor, for each water quality category of the at least one water quality category, a current index value for fresh water meeting said each water quality category, the index value determined based on a current price of said each root commodity that was associated with said each water quality category and based on at least one of (i) a quantity of fresh water constituent in said each root commodity that was associated with said each water quality category and (ii) a quantity of fresh water used in production of said each root commodity that was associated with said each water quality category.

Some preferred embodiments of this still further method also comprise displaying on a display associated with a computer one or more of the current index values for fresh water and an indicia identifying either water or a category of fresh water whose current index value is displayed on the display, the display also displaying a current price of at least one root commodity from which the at least one of the current index values is derived and an indicia identifying each root commodity of the at least one root commodify whose current price is displayed. Other preferred embodiments of this still further method comprise displaying on a first portion of a display associated with a computer one or more of the current index values for fresh water and an indicia identifying either water or a category of fresh water whose current index value is displayed on the first portion, the display also displaying on a second portion of the display a current price of at least one root commodify from which the at least one of the current index values is derived and an indicia identifying each root commodify of the at least one root commodify whose current price is displayed on the second portion.

The still further method also comprises in some preferred embodiments using a processor to adjust a price of pristine water based on a suitability of the pristine water for at least one of (i) drinking, (ii) agricultural use and (iii) industrial use.

Some other preferred embodiments of the still further method also comprise using a processor to adjust a price of non-pristine water based on a suitability of the non-pristine water for at least one of (i) drinking, (ii) agricultural use and (iii) industrial use.

Some preferred embodiments of the still further method also include determining, using a computer processor, a price of each of a plurality of financial instruments identifying on its face a particular amount of fresh water of a particular water qualify category, tire price of each financial instrument determined using the current index value of fresh water for one water qualify category.

The still further method, in some preferred embodiments, also includes measuring at least one water source that has fresh water with respect to at least one of TDS, carbonate content, pH, hardness, sodium, chloride, nitrate, toxins and sodium adsorption ratio to categorize the fresh water of the at least one water source by water quality category. Some preferred embodiments of the still further method involve measuring the at least one water source with respect to at least one of TDS, carbonate content, pH, hardness, sodium, chloride, nitrate, toxins and sodium adsorption ratio to categorize the fresh water of the at least one water source by water quality grade within a water quality category of the fresh water of the at least one water source.

A still further aspect of the present invention is an additional system for trading fresh water based on water quality, comprising a water quality measuring device for measuring fresh water of at least one water source with respect to at least one of TDS, carbonate content, pH, hardness, sodium, chloride, nitrate, toxins and sodium adsorption ratio; a computer for receiving data from the water quality measuring device with respect to the fresh water in regard to the at least one of TDS, carbonate content, pH, hardness, sodium, chloride, nitrate, toxins and sodium adsorption ratio and for comparing the received data to stored water quality standards to determine a water quality category for the fresh water, determining current prices of at least one root commodity, each root commodity being other than water, each root commodity of the at least one root commodity having at least one of (i) water as a constituent in the root commodity and (ii) water utilized in production of the root commodity, processing associations between each of at least one water quality category and at least one root commodity; and determining a current index value for fresh water of each water quality category of the at least one water quality categories based on a current price of said each root commodity and based on at least one of (i) a quantity of fresh water constituent in the root commodity associated with said each water quality category and (ii) a quantity of fresh water used in production of the root commodity. In the additional system, in some preferred embodiments, the computer is also for determining a water quality grade, processing associations between each of at least one water quality grade with the at least one root commodity, and determining a current index value for fresh water of each water quality grade based on a current price of said each root commodity and based on at least one of (i) a quantity of fresh water constituent in the root commodity associated with said each water quality grade and (ii) a quantity of fresh water used in production of the root commodity. The additional system also comprises, in some preferred embodiments, a display associated with the computer, the display for displaying an updateable current price of one or more root commodities and an updateable current price of fresh water of a particular (i) water quality category, (ii) water quality grade or (iii) water quality category and water quality grade, such that the current price of the fresh water of the particular water quality is dependent on the current price of the one or more root commodities. In some preferred embodiments, the updateable current price of one or more root commodities and the updateable current price of fresh water of a particular (i) water quality category, (ii) water quality grade or (iii) water quality category and water quality grade, are situated in different portions of the display.

One aspect of the present invention is a method for investing in fresh water based on a quality of the fresh water, comprising (a) determining, using a computer processor, current prices of at least one root commodity, root commodities being other than water, each root commodity of the at least one root commodity having at least one of (i) water as a constituent in said each root commodity and (ii) water utilized in production of said each root commodity; (b) associating at least one water quality category with at least one root commodity; and (c) determining, using a computer processor, for each water quality category of the at least one water quality category, a current index value for fresh water meeting said each water quality category, the index value determined based on a current price of the at least one root commodity that was associated with said each water quality category and based on at least one of (i) a quantity of fresh water constituent in said at least one root commodity that was associated with said each water quality category and (ii) a quantity of fresh water used in production of said at least one root commodity that was associated with said each water quality category.

These and other features, aspects and advantages of the present invention will become better understood with reference to the following drawings, descriptions and claims.

BRIEF DESCRIPTION OF THE DRAWINGS

Various embodiments are herein described, by way of example only, with reference to the accompanying drawings, wherein:

FIG. 1 is a flow chart showing a method in accordance with one embodiment of the present invention;

FIG. 2 is a flowchart showing a further method in accordance with one embodiment of the present invention;

FIG. 3 is a flow chart showing a still further method in accordance with one embodiment of the present invention;

FIG. 4 is a flowchart showing a further method in accordance with one embodiment of the present invention;

DETAILED DESCRIPTION OF THE INVENTION

Figure 5A:
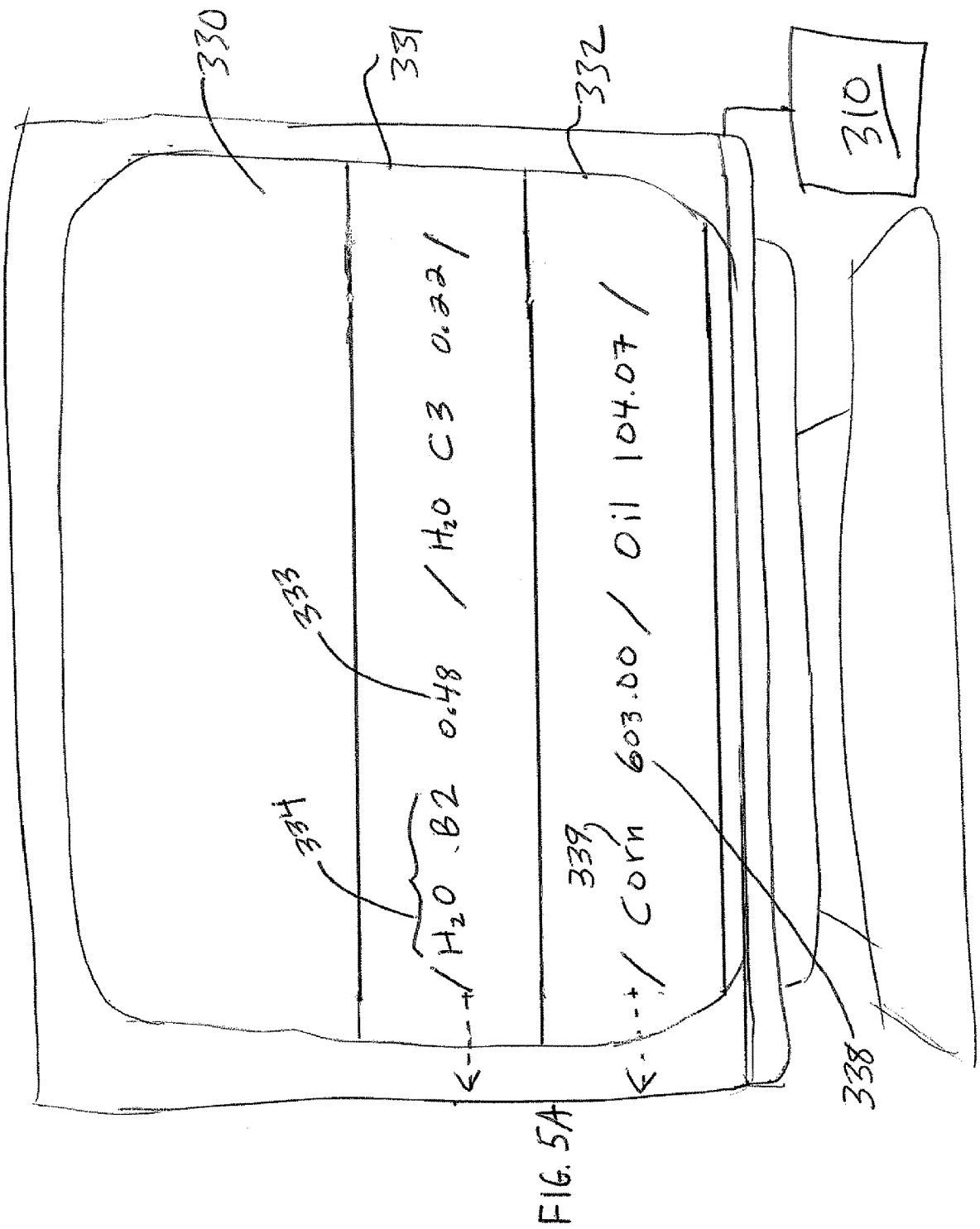
FIG. 5A is a schematic illustration of a display in accordance with one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a method and system for creating a stable price of fresh water that is based on the quality of the fresh water. This may be applied to fresh water of a particular water source. A financial instrument identifying on its face a particular amount of fresh water of a particular water quality category may state a price determined using an index value of fresh water of a particular water quality category. The method of the present invention may include determining, using a computer processor, current prices of at least one root commodity, each root commodity being other than water, each root commodity of the at least one root commodity having at least one of (i) water as a constituent in said each root commodity and (ii) water utilized in production of said each root commodity. The method may also include associating or matching each of at least one water quality category and/or quality grade with at least one root commodity such that a quality of water either constituent in the root commodity or used in production of the root commodity meets water quality standards of the respective water quality category.

The method may also involve determining, using a computer processor, a current index value for fresh water for each water quality category of the at least one water quality category. The method may also include measuring fresh water of at least one water source with respect to chemical or physical criteria such as at least one of TDS, carbonate content, pH, hardness, sodium, chloride, nitrate, toxins and sodium absorption ratio to determine the water quality category and/or the water quality grade of fresh water from that water source. A system of the present invention may include a water quality measuring device for measuring fresh water of at least one water source with respect to at least one of TDS, carbonate content, pH, hardness, sodium, chloride, nitrate, toxins and sodium absorption ratio. The system may also include a computer for receiving data from the water quality measuring device with respect to the fresh water in regard to the at least one of TDS, carbonate content, pH, hardness, sodium, chloride, nitrate, toxins and sodium absorption ratio and for comparing the received data to stored water quality standards to determine a water quality category for the fresh water. The computer may also determine current prices of at least one root commodity (the root commodities being other than water), each root commodity of the at least one root commodity having at least one of (i) water as a constituent in the root commodity and (ii) water utilized in production of the root commodity. The computer may also be for processing associations between each of at least one water quality category with at least one root commodity and determining a current index value for fresh water of each of the water quality categories based on a current price of said each root commodity and based on at least one of (i) a quantity of fresh water constituent in the root commodity associated with said each water quality category and (ii) a quantity of fresh water used in production of the root commodity. The present invention may also include in the method or system a display associated with a computer displaying an updateable current price of one or more root commodities and an updateable current price of fresh water of a particular (i) water quality category, (ii) water quality grade or (iii) water quality category and water quality grade, the current price of the fresh water of the particular water quality being dependent on the current price of the one or more root commodities. The independent variable (prices of root commodities) may be displayed on a different portion of the display that the dependent variable (prices of the fresh water of a particular water quality category and/or grade.

In contrast to the prior art, where there is neither a method nor a system for creating a stable price for fresh water other than U.S. Pat. No. 8,024,239, and where in that '239 patent the price does not take into consideration water quality, the method and system of the present invention may create a stable price for fresh water, and a financial instrument associated therewith, which takes into consideration the quality of the water. By considering the quality of the water, the price may be more accurate, more stable and more tailored to the different water sources throughout the different regions of the world. In fact, today certain bottled water that comes from the Swiss Alps may command an inflated price, i.e. a higher price than the quality would dictate, from the fact that the Alps have a reputation for high quality water yet in reality, due to constant pollution from pharmaceutical companies in the area, the quality has suffered. The present invention would lead to a more accurate, quality-based price since the price may be tied to the water quality and since the quality of that water source may be measured and this measurement may be updated at reasonable intervals, for example annually. Furthermore, having the price of water be based on water quality may better enable the utilization of water resources as financial collateral. This may further facilitate trade at a time when new equity is desperately being sought, particularly in Europe. In contrast to the prior art, where the price of the water may not be based on water quality categories, the present invention, by utilizing categories of water quality to create a price and to create financial instruments using that price, may encourage better water quality since one may be able to charge a higher price for water of higher water quality. In further contrast to the prior art, the present invention may adjust a price of water based on geographical location of the water source. In contrast to the prior art, in which a display may display only one type of commodity, the display used in the method and system of the present invention may display both prices (or an index of) one or more root commodities and a price (or an index) for one or more categories and/or grade of fresh water based on quality, wherein the price of the fresh water may be derived from the price of one or more of the root commodities. Furthermore, in further contrast to the prior art, in which a display of commodity prices may have various prices of various commodities in a particular portion of the display, but where there is no dependence between the price of one commodity displayed and the price of another commodity displayed, the display associated with the system and method of the present invention may display prices of one or more root commodities and prices or indices of one or more water quality categories and/or one or more water quality grades of fresh water wherein the price of the water is derived from tire price of one or more of the root commodities. Furthermore, in certain preferred embodiments, the display of the method and system of the present invention may include a display of prices of one or more root commodities in a first portion of the display and the prices of various quality categories and/quality grades of fresh water in a second portion of the display, wherein the prices of the one or more quality categories and/or grades of fresh water displayed in the second portion of the display may be derived from and dependent on the displayed prices of one or more of the root commodities displayed in the first portion of the display. Each of these displayed prices may be constantly updated. By displaying the price of a water commodity and the price of root commodities from which the price of water commodity is computed in this manner, a user of the display may be presented with a graphical illustration, discernable at a glance, of the relationship of the price of water to the price of the root commodities. This may provide users of the display with a better appreciation of this relationship between the commodities. Furthermore, by displaying water indices separately from other commodities, this may draw attention to tire new use of water as a commodity and encourage water quality improvement since the prices of the water are tied to the quality category and/or grade of the fresh water. In further contrast to the prior art, in which water is measured merely to see if it meets minimal standards for drinking, the present invention may include a step of measuring the quality of a source of water (for example for TDS, carbonate, pH etc.) in order to fit the water into water quality categories (i.e. for pristine, for domestic, agricultural, industrial) and optionally grades of quality within each category. Furthermore, in contrast to the prior art, the present invention may include a step of measure the quality of the water source in order to create categories of water quality to create separate prices (base prices or otherwise) for each water quality category.

The principles and operation of a method and system for a fresh water price index based on water quality according to the present invention may be better understood with reference to the drawings and the accompanying description.

Following are some examples of how to calculate a price of fresh water (and a financial instrument based on such a price) that is based on water quality.

"Fresh water" should be understood as including fresh water that has solidified in the form of ice, for example icebergs. When referring in this patent application to "associating", "association" or "matching" water quality categories with root commodities, this should be understood as also encompassing associating or matching root commodities with only a portion of a water quality category (i.e. a grade). For example, a matching of grade A1 (where "A" is the water quality category) with a root commodity, shall be understood to fall within and be an example of matching or associating water quality categories with root commodities.

In order to define a stable market for water based on water quality, one may define a few basic water quality categories. Then making use of U.S. Pat. No. 8,024,239 to Shirazi, one may define a market value for water for each water quality category or water category use based on the price of freely traded commodities that require water of the each given quality type. Then one may define a price index for different qualities of water based on the applicable use and price. Finally, one may compute a price of water from a particular water source based on the suitability of the water for the different categories of water quality or use.

Categories—four general categories of water use are:
1. Pristine quality—fit to sell and drink untreated as mineral or spring water; 1a Drinking water derived from icebergs, treated or untreated
2. Domestic—high quality—fit to optionally treat (e.g. add chlorine, fluoride or other supplements), to sell, and distribute for drinking or other residential-type purposes (i.e. showers) that is typically run through a water faucet rather than placed into bottles for sale;
3. Agricultural quality—medium quality;
4. Industrial quality minimum quality, will not harm machines or manufacturing process.

Water quality may be characterized according to the following aspects:
1. Total Dissolved Solids (TDS)
2. Carbonate Content ($H_2CO_3$)
3. pH
4. Hardness (Ca, Mg)—expressed as mg/l $CaCO_3$
5. Sodium (Na)
6. Chloride (Cl)
7. Nitrate ($NO_3$)
8. Toxins
9. Sodium Adsorption Ratio (SAR)
Specific Requirements
Pristine Water In order to be salable as spring or mineral water, water has to come from a natural source that is drinkable without treatment. In general this entails that the water fulfill drinking standards and be protected from contact with human diseases. Practically this applies only to pristine ground water (deep groundwater or groundwater from an uninhabited area) which also fulfill drinking water standards.

To qualify as pristine, water must come either from a deep confined aquifer or from a protected area (e.g. uninhabited area).

Toxins must be within drinking water standards. It is not the intention herein to list all toxins in water since this is known in the standard and since standards may change over time as to what constitutes a toxin. Rather, what is presented below is an example of how criteria may be developed from available knowledge to produce a systematic quality based value system for water. An example of drinking water standards for toxins

TABLE 1

| Quality requirements for pristine water (Medium quality) | |
| --- | --- |
| TDS | <3,500 mg/l |
| $H_2CO_3$ | <1500 mg/l |
| pH | 5-10 |
| $CaCO_3$ | 500 mg/l |
| Na | <20 mg/l |
| Cl | <300 mg/l |
| $NO_3$ | <5 mg/l |

In some preferred embodiments, there may be a further categorization of pristine water into grades. For example, bottled water (which is an example of water from pristine source) may be broken down into grades and labeled/graded for example as $A_{bottled}1, A_{bottled}2, A_{bottled}3$ based on whether relative quality of the bottled water is high, medium or low.

Total Dissolved Solids (TDS)

Regulations regarding TDS vary throughout the world. In the United States, for example, bottled water must contain at least 250 mg/l TDS to be labeled as mineral water. TDS above 500 mg/l qualifies water as "low mineral content"; more than 1,500 mg/l allows a "high mineral content" label.

Distilled water has a TDS of 0 mg/l; seawater has about 34,000 mg/l. Most bottled waters fall within a TDS range of 50 to 800 mg/l (Ducale, 55 mg/l; Parana, 188 mg/l; Fiji, 210 mg/l; Evian, 357 mg/l; Perrier, 475 mg/l), but many highly regarded waters have a much higher TDS (San Pellegrino, 1,109 mg/l; Badoit, 1,200 mg/l; Contrex, 2,032 mg/l; Gerolsteiner, 2,527 mg/l). Some of these waters are thought to be curatives-their mineral compositions are believed to have healing properties (Famous Crazy, 2,783 mg/l; Vichy Célestins, 3,378 mg/l). But some curative waters have a low TDS: Fiuggi, for example, has a TDS of only 122 mg/l.

Hardness

Hard water does not negatively affect health or taste. According to the U.S.

National Research Council, the magnesium and calcium in hard water can actually contribute to daily dietary requirements.

pH pH has a very minor effect on the taste of water and no known health effects.

Domestic

Water that meets drinking quality standards, but does not come from a protected source is not recommended for drinking without treatment (although there are bottlers that sell such water without treatment, the practice is frowned upon and has led to disease outbreaks). Under any conditions, while certain brands of "spring water" from suburban wells may fetch a high price, this is not a function of the quality of the water.

Generally, along with meeting health and taste standards, domestic water must also be fit for general use and transport. This puts limits on domestic quality water that are not found in more expensive pristine waters. For example,
the pH of domestic water must not be too low (in order to prevent corrosion and leaching of pipes);
domestic water should not be too hard (Ca, Mg); hard water makes cleaning more difficult and more dependent on soaps and synthetic detergents; hardness also causes scaling in boilers; softening water adds Na and can have negative effects on the taste of water;

drinking water standards do not allow high TDS in domestic water (as opposed to prestigious mineral waters).

TABLE 2

Quality requirement for domestic water

| | High quality | medium quality | low quality |
|---|---|---|---|
| TDS | <50 mg/l | <150 mg/l | <500 mg/l |
| $H_2CO_3$ | 30 < $H_2CO_3$ < 250 mg/l | <400 mg/l | <500 mg/l |
| pH | 5-10 | 5-10 mg/l | 5-10 mg/l |
| $CaCO_3$ | <100 mg/l | <200 mg/l | <400 mg/l |
| Na | <5 mg/l | <20 mg/l | <50 mg/l |
| Cl | <20 mg/l | <300 mg/l | <400 mg/l |
| $NO_3$ | <1 mg/l | <5 mg/l | <20 mg/l |

Toxins must be less than drinking water standards

Agricultural

A very important factor in the suitability of water for irrigation is the salt content. The suitability of a water for irrigation is determined not only by the total amount of salt present (measured as TDS) but also by the kind of salt. The problems caused by salts vary both in kind and degree, and are modified by soil, climate and crop, as well as by the skill and knowledge of the water user. As a result, there is no set limit on water quality; rather, its suitability for use is determined by the conditions of use which affect the accumulation of the water constituents and which may restrict crop yield. The soil problems most commonly encountered and used as a basis to evaluate water quality are those related to salinity, water infiltration rate, toxicity and a group of other miscellaneous problems.

Salinity—Salts in soil or water reduce water availability to the crop to such an extent that yield is affected.

Water Infiltration Rate—Relatively high sodium or low calcium content of soil or water reduces the rate at which irrigation water enters soil to such an extent that sufficient water cannot infiltrate to supply the crop adequately from one irrigation to the next.

Specific Ion Toxicity—Certain ions (sodium, chloride, or boron) from soil or water accumulate in a sensitive crop to concentrations high enough to cause crop damage and reduce yields.

Miscellaneous—Excessive nutrients reduce yield or quality; unsightly deposits on fruit or foliage reduce marketability; excessive corrosion of equipment increases maintenance and repairs.

An important factor in the suitability of water for agriculture which is not present in drinking water standards is the SAR (Sodium Adsorption Ratio) defined as $Na/((Ca+Mg)/2)^{1/2}$ where Na, Ca, and Mg are the equivalent concentrations of the respective ions in me/l. According to the FAO the ability of water to infiltrate is controlled by the SAR and the TDS approximately as follows.

TABLE 3

SAR requirements for agricultural water

| | High quality | Medium quality | Low quality |
|---|---|---|---|
| 0-3 and TDS = | >500 mg/l | 500-75 mg/l | <75 mg/l |
| 3-6 = | >1000 mg/l | 1000-150 mg/l | <150 mg/l |
| 6-12 = | >1500 mg/l | 1500-400 mg/l | <400 mg/l |

TABLE 3-continued

SAR requirements for agricultural water

| | High quality | Medium quality | Low quality |
|---|---|---|---|
| 12-20 = | >2000 mg/l | 2000-1500 mg/l | <1500 mg/l |
| 20-40 = | >5000 mg/l | 5000-2000 mg/l | <2000 mg/l |

TABLE 4

Quality requirements for agricultural water

| | High quality | medium quality | low quality |
|---|---|---|---|
| TDS | <450 mg/l | <2000 mg/l | >2000 mg/l |
| $H_2CO_3$ | <75 mg/l | <500 mg/l | >500 mg/l |
| pH | 6.5-8.4 | 6.5-8.4 | 6.5-8.4 |
| $CaCO_3$ | <75 mg/l | <500 mg/l | <2000 mg/l |
| Na | <75 mg/l | <200 mg/l | <800 mg/l |
| Cl | <100 mg/l | <300 mg/l | <800 mg/l |
| $NO_3$ | <10 mg/l | <20 mg/l | <50 mg/l |

Similar to toxins for drinking water, one may define water as fit for agriculture only if certain plant toxins are within the limitations listed in table 2 of the attached FAO document *Water Quality for Agriculture* http://www.fao.org/docrep/003/T0234E/T0234E01.htm#ch1.2.industrial One may assume that industrial use has certain minimal requirements to the effect that the water not damage machinery.

TABLE 5

Quality requirements for industrial water

| | High Quality | Medium quality | Low quality |
|---|---|---|---|
| TDS | <150 mg/l | <350 mg/l | <500 mg/l |
| $H_2CO_3$ | 30 < $H_2CO_3$ < 250 mg/l | <400 mg/l | <500 mg/l |
| pH | 6.5-8 mg/l | 6.5-8 | 6.5-8 |
| $CaCO_3$ | <100 mg/l | <200 mg/l | <200 mg/l |
| Na | <15 mg/l | <30 mg/l | <50 mg/l |
| Cl | <100 mg/l | <300 mg/l | <400 mg/l |
| $NO_3$ | <50 mg/l | <50 mg/l | <100 mg/l |

Quality Categories—an Index Pricing

Based on an analysis of relevant aspects of water quality we can design a unified basis for pricing. For example, the price structure may categorize water by its most strict use. Then the various quality aspects may be used to determine quality categories within each primary use category.

Water Categories

Water may be categorized into the following four general categories of use:

A. Domestic at least fulfills minimal domestic standards;
B. Agricultural—does not meet drinking standards by at least fulfills minimal agricultural standards;
C. Industrial quality—does not fit agricultural or drinking standards, but fulfills at least minimal industrial standards.

Categories of Water Quality

Pristine Water

Pristine water is water from a pristine natural source that is drinkable without treatment. To qualify as pristine, water must come either from deep confined aquifer or from a protected area (e.g. uninhabited area). Toxins must be within drinking water standards. For example, to qualify as "pristine" waters, water will need to fulfill the minimal drinking water standards of some large body e.g. the US, the EEC or WHO for toxin content. In some cases, standards for pristine ready-to-drink water may differ from (and even be less strict than) municipal water standards.

Pristine water must come from a protected source, and fulfill the requirements of Table 1, and be within EEC drinking standards except for where they differ from Table 1.

Due to the limited marketability of bottled water, pristine water, the value of pristine water depends on its secondary use. Pristine water of municipal quality (A1, A2, A3) may be assigned a value of ⅓ the value of purified water+⅔ the value of domestic water. Pristine water not of municipal quality (B1, B2, B3, C1, C2, C3) may be assigned a value of ¼ the value of bottled water+¾ the value of water for secondary use. (Since pristine water is to be used for drinking, pristine water loses a lot of value if it does not fit drinking standards). It should be understood that these assigned fractions (⅓ and ⅔; ¼ and ¾) are merely examples of fractions that may be chosen to effectuate weighted combinations and other fractional amounts (or non-fractional coefficients) may be used.

For example, the value of purified water (used to calculate the value of pristine water) may be calculated from the prices of ready-to-drink waters (bottled water and purified water). An example of such calculation is given in U.S. Pat. No. 8,024,239; there, the value of purified water is labeled Pb and may sometimes be referred to as "bottled water". Herein the terms "bottled water" and Pb may also be used in the more general sense of "ready to drink waters".

In an alternative arrangement, pristine water may also receive a second f* bonus/penalty due to its secondary use. If the A1 water ALSO fulfills A2 standards then f*=1.2. If the A2 water does not fulfill A2 standards but fulfills A3 standards then f*=1. If the A1 water does not fulfill A3 standards but fulfills B3 standards then f*=0.5. If the A2 water does not fulfill A3 standards or B1 standards then f*=0.3.

A1, A2, A3: Domestic

Water that meets drinking quality standards, but does not necessarily come from a protected source is not recommended for drinking without treatment.

A1 water must fulfill the requirements of high quality drinking water from Table 2, and be within EEC drinking standards except for where they differ from the requirements of high quality drinking water from Table 2.

A2 water must fulfill the requirements of medium quality drinking water from Table 2, and be within EEC drinking standards except for where they differ from the requirements of medium quality drinking water from Table 2.

A3 water must fulfill the requirements of low quality drinking water from Table 2, and be within EEC drinking standards except for where they differ from the requirements of low quality drinking water from Table 2.

B1, B2, B3: Agricultural

Category B is for water that is not pristine and not fit for drinking (domestic) use, but is fit for agricultural use.

B1—fulfills the medium quality standards of Table 3 and the high quality standards of Table 4.

B2—fulfills all of medium quality standards of Table 3 and Table 4.

B3—fulfills all of low quality standards of Table 3 and Table 4.

Similar to toxins for drinking water, one may define water as fit for agriculture only if certain plant toxins are within the limitations listed in table 2 of the attached FAO document *Water Quality for Agriculture* http://www.fao.org/docrep/003/T0234E/T0234E01.htm#ch1.2, incorporated herein by reference.

Alternatively, agricultural waters may be graded according to suitability to a given crop. For example, waters suitable for all crops may be defined as B1 whereas water suitable for grain and trees but not for vegetables may be B2 and water suitable for trees only may be B3.

C1, C2, C3: Industrial

Category C is for water that is not pristine and not fit for drinking (domestic) use, and is not fit for agricultural use, but is fit or industrial use. Subcategories of category C may be created. For example, C1—fulfills all of high quality standards of Table 5.

C2—fulfills all of medium quality standards of Table 5.

C3—fulfills all of low quality standards of Table 5.

Pricing

From the above, various possible pricing systems can be made. For example:

From U.S. Pat. No. 8,024,239 to Shirazi the prices of water according to use are:

| TOTAL Fresh | Expe | domestic | desalinate | bottled | purify | food crops | biofuels |
|---|---|---|---|---|---|---|---|
| $0.89 Portion | 0.05 | 0.5 | 0.0995 | 0.0005 | 0.05 | 0.2 | 0.1 |
| Value | $0.92 | $0.77 | $2.11 | $200.00 | $1.75 | $0.20 | $0.22 |
| W*X | 0.046 | 0.38375 | 0.209945 | 0.1 | 0.0875 | 0.0396 | 0.022 | bottled = bottled + purify:
portion = Wb = 0.05 + 0.0005 = 0.0505;
price = Pb = (.05($1.75) + 0.0005($200))/0.0505 = $3.71
domestic = domestic + export + desalinate;
portion = Wd = 0.05 + 0.5 + .0995 = 0.65;
price = Pd = (.05($0.92) + 0.5($0.77) + 0.0995($2.11))/0.65 = $0.99
agriculture = food crops
portion = Wa = 0.2;
price = Pa = $0.040
industrial = biofuels
portion = Wi = 0.1;
price = Pi = $0.022

TABLE 6

Water prices index from Shirazi U.S. Pat. No. 8,024,239

|  | Bottled (Wb Pb) | Domestic (Wd Pd) | Agriculture (Wa Pa) | Industrial (Wi Pi) |
|---|---|---|---|---|
| Portion (W) | 0.05 | 0.65 | 0.2 | 0.1 |
| Price (P) | $3.71 | $0.99 | $0.04 | $0.022 |

In the above Table 6, "Portion (W)" may be described as the market share of that category of water in the total fresh water market.

We will take the base water price of agricultural water as Pa=$0.04. Then the price will be adjusted as follows. The three rows of Table 7a below represent different levels of suitability relative to certain water quality standards of water that comes from a particular source, or specific water being sold:

Water Pricing:

TABLE 7a

Calculations for Water from a Pristine Source - Depending on which Quality Standards it fulfills

|   |   | A - Domestic | B - Agriculture | C - industrial |
|---|---|---|---|---|
| 1 | How calculate | Pb/3 + 2Pd/3 | Pb/4 + 3Pa/4 | Pb/4 + 3Pi/4 |
|   | Calculation | 3.7/3 + 2(.99)/3 | 3.7/4 + 3(.04)/4 | 3.7/4 + 3(.02)/4 |
|   | Price | 1.9 | 0.96 | 0.94 |
| 2 | How calculate | Pb/3 + 2Pd(0.6)/3 | Pb/4 + 3Pa(0.6)/4 | Pb/4 + 3Pi(0.6)/4 |
|   | Calculation | 3.7/3 + 2(.99)0.6/3 | 3.7/4 + 3(.04)0.6/4 | 3.7/4 + 3(.02)0.6/4 |
|   | Price | 1.6 | 0.95 | 0.94 |
| 3 | How calculate | Pb/3 + 2Pd(0.3)/3 | Pb/4 + 3Pa(0.3)/4 | Pb/4 + 3Pi(0.3)/4 |
|   | Calculation | 3.7/3 + 2(.99)0.3/3 | 3.7/4 + 3(.04)0.3/4 | 3.7/4 + 3(.02)0.3/4 |
|   | Price | 0.96 | 0.94 | 0.93 |

Pristine water of municipal quality (A1, A2, A3) has been assumed in these calculations to have a value of ⅓ the value of purified water+⅔ the value of domestic water. It should be understood that these assigned fractions (⅓ and ⅔; ¼ and ¾) are merely examples of fractions that may be chosen to effectuate weighted combinations and other fractional amounts (or non-fractional coefficients) may be used.

Pristine water not of municipal quality (B1, B2, B3, C1, C2, C3) has been assumed in these calculations to have a value of ¼ the value of purified water+¾ secondary use. The selection of the fraction may differ and this is only an example of how to mathematically represent a weighted combination.

TABLE 8b

Calculations for non-Pristine Water

|   |   | A - Domestic | B - Agriculture | C - industrial |
|---|---|---|---|---|
| 1 | How calculate | Pd | Pa | Pi |
|   | Calculation | 0.99 | 0.04 | 0.02 |
|   | Price | 0.99 | 0.04 | 0.02 |
| 2 | How calculate | 0.6Pd | 0.6Pa | 0.6Pi |
|   | Calculation | 0.6(0.99) | 0.6(0.04) | 0.6(0.02) |
|   | Price | 0.59 | 0.024 | 0.012 |
| 3 | How calculate | 0.3Pd | 0.3Pa | 0.3Pi |
|   | Calculation | 0.3(0.99) | 0.3(0.04) | 0.3(0.02) |
|   | Price | 0.3 | 0.012 | 0.006 |

The calculated price will be the price factor times the base price (Pa=$0.04). Thus, the resulting index prices are in dollars per m³ based on the Shirazi U.S. Pat. No. 8,024,239 data:

TABLE 9a

Example category prices Pristine Water Water Index Price in $/m3

|   | A - Domestic | B - Agriculture | C - industrial |
|---|---|---|---|
| 1 | $1.90 | $0.96 | $0.94 |
| 2 | $1.63 | $0.95 | $0.94 |
| 3 | $1.43 | $0.94 | $0.93 |

TABLE 10b

Example category prices Non-Pristine Water Water Index Price in $/m3

|   | A - Domestic | B - Agriculture | C - industrial |
|---|---|---|---|
| 1 | $0.99 | $0.04 | $0.02 |
| 2 | $0.59 | $0.02 | $0.01 |
| 3 | $0.30 | $0.01 | $0.01 |

The water price index may take into account geographical preferences (i.e. pristine A1 water from Iceland may be more valuable that pristine A1 water from Brazil).

Packaging infrastructure, distance from markets and transportation routes may also have to be taken into account when formulating a final price for the fresh water. Transportation and storage costs may be a significant part of the overall price of a final price that a buyer pays. The price of fresh water displayed in a commodities exchange or which is used for a financial instrument may include the storage and transport costs or in other case do not include such costs. Examples of packaging include shipping containers, large plastic bags holding the fresh water and in situ (at the source of the water) storage. Optionally, the market for natural gas may be considered as a model for these storage and transportation factors since, like water, a large part of the price of natural gas is for transport.

EXAMPLES

Based on the above water a good municipal water supply would (for example) have an A2 rating.

Ulvato bottled water is grade A1 (pristine) but does not fit domestic water standards (to high TDS) or agricultural standards (to low pH) therefore f*=0.3 and would be evaluated as 0.3*1.88=$0.57/m³

| Ulvato water: | |
|---|---|
| 752 | TDS |
| 5.8 | ph factor |
| 796 | Hardness |
| 171 | Calcium |
| 79 | Chloride |
| 1 | Fluoride |
| 574 | Hydrogeniccarbonate |
| 28 | Magnesium |
| 6.9 | Nitrate |
| 8 | Potassium |
| 11 | Silica |
| 74 | Sodium |
| 104 | Sulphates |

Santa Vittoria water is pristine and gets A1 rating. It is also does not meet A2 high quality domestic water standards (too high TDS carbonates and nitrate) but does fulfill A3 standards therefore f*=1 and the index price is $1.88/m³.

| Santa Vittoria Analysis: Temp. at source: 47° F. (8.3° C.) | |
|---|---|
| 169 | TDS |
| 8 | ph factor |
| 36.2 | Calcium |
| 0.9 | Chloride |
| 189.0 | Hydrogen carbonate |
| 18.4 | Magnesium |
| 2.5 | Nitrate |
| 0.5 | Potassium |
| 0.6 | Sodium |

Lake Placid N.Y. for example would get an A2 rating, and therefore an index price of $0.90/m³.

Pricing—Another Possible System

Other possible pricing systems can be made. For example:

Starting with the index prices of U.S. Pat. No. 8,024,239 to Shirazi (Table 6) another way of computing a price would be to add a suitability factor (f) to the price equation of U.S. Pat. No. 8,024,239 to Shirazi. P=Fb*Pb*Wb+Fd*Pd*Wdb+Fa*Pa*Wa+Fi*Pi*Wi For example: For a given water and use:

f=1.0 if the water is high quality for that use
f=0.8 if the water is medium quality for that use
f=0.5 if the water is high low for that use
f=0.25 if the water is not fit for that use Thus, the price of water fit for being bottled Fb=1.0, highly fit for domestic Fd=1.0, well fit for agriculture Fa=1.0 and well fit for industry Fi=1.0 may be computed as the following combination of elements:

1.0*0.05*3.71+1.0*0.65*0.99+1.0*0.2*0.4+
1.0*0.1*0.022=0.83

In another example, the price of water not fit for bottled Fb=0.25, having medium fitness for domestic Fd=0.8, well fit for agriculture Fa=1.0 and well fit for industry Fi=1.0 may be computed by combining as follows:

0.25*0.05*3.71+0.8*0.65*0.99+1.0*0.2*0.4+
1.0*0.1*0.022=0.57

In a third example, the price of water fit for being bottled Fb=1.0, low fit for domestic Fd=0.5, low fit for agriculture Fa=0.5 and well fit for industry Fi=1.0 may be calculated as 1.0*0.05*3.71+0.5*0.65*0.99+0.5*0.2*0.4+
1.0*0.1*0.022=0.57.

In each of the above three examples, each of the four addends comprise three multiplicands including (1) the suitability factor of the water for a respective water quality category, (2) a market share of the water quality category and (3) a price index for water of that water quality category.

Accordingly, as shown in FIG. 1, the present invention may in general be characterized as a method 100 for investing in fresh water based on a quality of the fresh water. Method 100 may have a step 110 of (a) determining, using a computer processor, current prices of at least one root commodity other than water (all root commodities being other than water), each root commodity of the at least one root commodity having at least one of (i) water as a constituent in said each root commodity and (ii) water utilized in production of said each root commodity.

Another step 120 of method 100 may be associating or matching each of at least one water quality category in a plurality of water quality categories with at least one root commodity of the plurality of root commodities. The matching or associating may be such that a quality of water (i) that is used in production of the root commodity and/or (ii) that is constituent in the root commodity, meets (or in other preferred embodiments is related to) water quality standards of the respective water quality category. An example of matching/associating is to take corn as a root commodity and match or associate either the water constituent in corn and/or the water used in the production of corn, with water quality category B1, B2 or B3 (water that is suitable for agricultural use and fits certain standards of Tables 3 and 4). One may make the assumption, for example, that water in corn and/or water used in the production of corn meets (or in other preferred embodiments is otherwise related to) the water quality standards B1 or B2 or B3. Step 120 may in some preferred embodiments be performed by a processor.

Alternative versions of step 120 (or equivalent steps/elements of other methods/systems) may be possible. That is, one may associate or match each of at least one water quality category in at least one water quality categories with at least one root commodity such that a quality of water (i) that is used in production of the root commodity and/or (ii) that is constituent in the root commodity, is related to water quality standards of the respective water quality category in some other way. To take one example, instead of meeting the standard, the water meets part of the standard or meets the lowest acceptable example of the standard or is within 50% (or another percentage) of the standard. In any method or system of the present invention, instead of a water quality category, the association may be made between a water quality grade (i.e. "A1") within the broader water quality category and the at least one root commodity.

A further step 130 of method 100 may be determining, using a computer processor, for each water quality category of the at least one water quality category, a current index value for fresh water meeting said each water quality category, the index value determined based on a current price of said each root commodity that was matched with said each water quality category and based on at least one of (i) a quantity of fresh water constituent in said each root commodity that was matched with said each water quality category and (ii) a quantity of fresh water used in production of said each root commodity that was matched with said each water quality category.

Method 100 may also include physically measuring fresh water of at least one water source with respect to chemical or physical criteria of the water, for example measuring at least one of TDS, carbonate content, pH, hardness, sodium, chloride, nitrate, toxins and sodium adsorption ratio, to determine the water quality category and/or the water quality grade of fresh water from that water source. The results of the measuring may be compared to pre-set water quality standards in the form of ranges of each item (e.g. TDS, carbonate content, pH, hardness, sodium, chloride, nitrate, toxins and sodium adsorption ratio) associated with each water quality category and/or water quality grade, as set forth in Tables 1 through 5 above and in the suggested definitions of water quality grades A1, A2, A3, B1, B2, B3, C1, C2, C3 discussed above. The water quality measuring may be performed using one or more water quality measuring devices 380, 680, 780 (see FIGS. 6A, 6B, 7, 8). Updates of the water quality of a water source may be performed by re-measuring the water source using a water measuring device at a reasonable interval. Typically, water sources may be re-measured and updated as to quality categories and grades annually or in some cases more frequently or less frequently.

Method 100 (or method 200 or method 800) may have a further step involving a display. In some preferred embodiments, such as shown in FIG. 5B, the further step may comprise displaying on a display 330 associated with a computer an updateable current price of one or more root commodities and an updateable current price of fresh water of a particular (i) water quality category, (ii) water quality grade or (iii) water quality category and water quality grade, wherein the current price of the fresh water of the particular water quality is dependent on the current price of the one or more root commodities. The arrow in FIG. 5B indicates that the displayed prices and indicia are moving like a "ticker tape".

A numerically significant change in the current price of the one or more root commodities (which may be viewed as an independent variable) may result in a visible change in the current price of the fresh water of the particular water quality (which may be viewed as a dependent variable). A "numerically significant" change in the price of the independent variable may be defined as a change that is enough to bring about a change of at least one digit of the displayed price of the dependent variable.

Figure 5B:
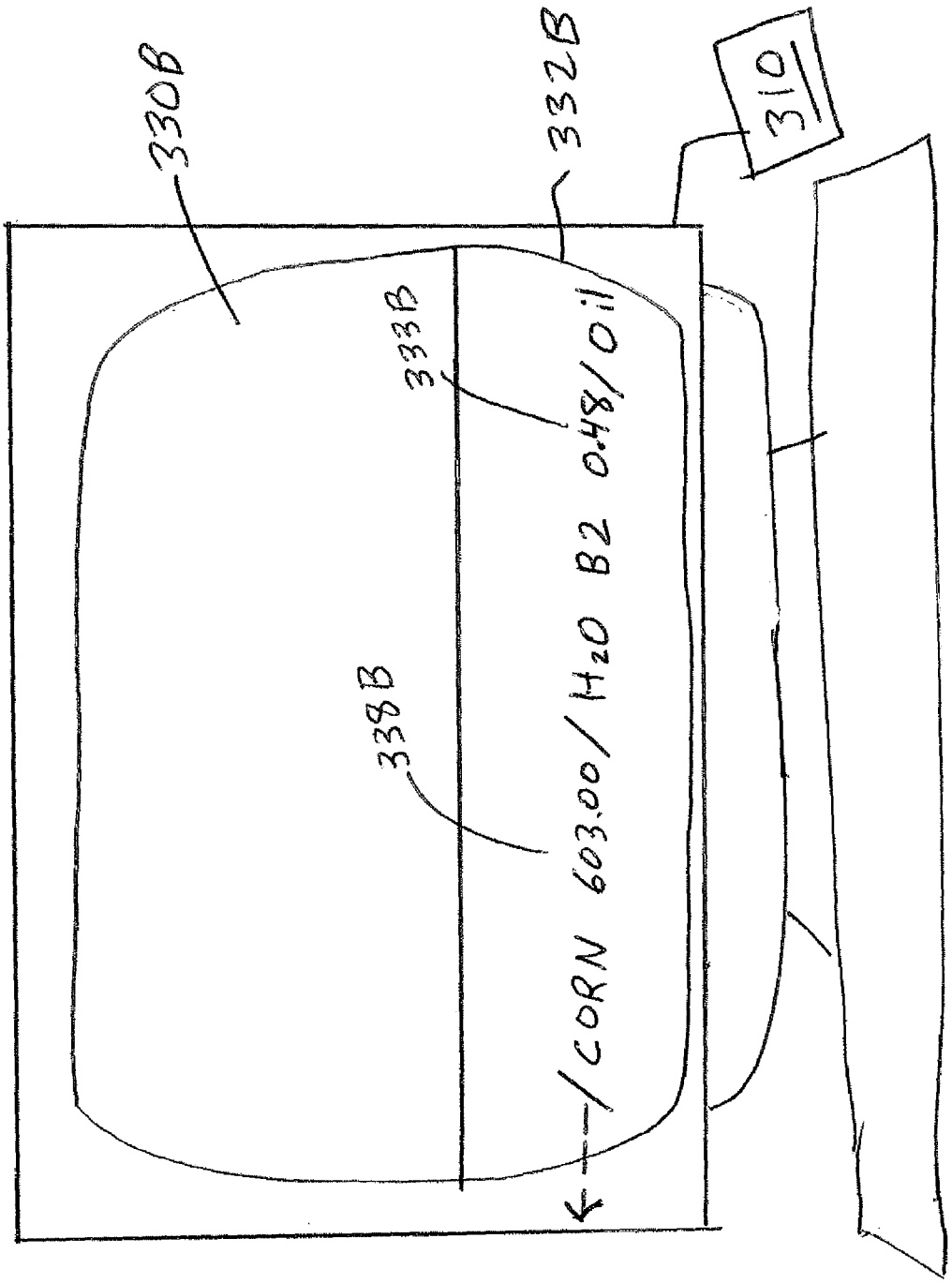
FIG. 5B is a schematic illustration of a display, different than the display shown in FIG. 5A, in accordance with one embodiment of the present invention.

In other preferred embodiments, as shown in FIG. 5A, the further step involving the display may comprise displaying on a first portion of a display associated with a computer (which may be the computer processor used in step 120) at least one of the current index values for fresh water (which may be updateable) and some name or indicia (i.e. "water B3") identifying water as the commodity and/or the category and/or grade of fresh water whose current index value is displayed on the first portion. In any method or system of the present invention, an indicia may identify a category of fresh water by denoting water of that category even without including the term "water" or the term "H$_2$O" as part of the indicia such as by using some other symbol known to those who may view the display as indicating water or water of a particular quality category and/or grade. The display may also display on a second portion of the display a current price of at least one root commodity from which the at least one of the current index values is derived and some name or indicia (i.e. "corn") identifying a root commodity (and preferably each such root commodity) whose current price is displayed on the second portion. Accordingly, an independent variable being a current price of at least one root commodity may be displayed on one portion of the display and a dependent variable being a current price of at least one water quality category and/or grade may be displayed on a different portion of the display. This may cause the prices of the fresh water (and its quality) and its dependence on the root commodity prices to be more conspicuous.

It should be understood that the displays of FIGS. 5A and 5B are merely examples of how the prices/indices may be displayed. Furthermore, in FIG. 5A, the first and second portions 331, 332 of the display 330 are shown one on top of the other and as a moving "tape". This is of course not a limitation and the first and second portion can be in a static table format or in any other visible format.

In any method or system of the present invention, the current index values or the at least one of the current index values displayed may be updated over time as the factors used in determining the price themselves get updated. For example, the displayed current price of the one or more root commodities may vary and be updated. In addition, if there are multiple root commodities, the market share of the various respective root commodities may change. In addition, the amount of water constituent in the root commodities may change and the amount of water used in production of a root commodity may change, although these latter two factors are not as likely to change as often as the market share or price. With respect to any of the methods or systems of the present invention, the display and in particular the prices and index values on the display, may be accessible to the public either by appearing on a web site or on a ticker tape on a building or in other ways known in the art for the display of commodity prices.

In some preferred embodiments, a further step of the method 100 may be determining, using a processor, a price of fresh water derived from a particular water source (or a specific amount of water being sold) by determining a current level of suitability of that fresh water for each of the plurality of water quality categories and by then combining all of the current index values of the fresh water of each water quality categories together by weighting each index value being combined by (i) the determined current level of suitability of the fresh water being priced (i.e. water from the particular water source or the specific quantity of water being sold) for each of the plurality of water quality categories and by (ii) a market share of water from each water quality category.

An example of use of the level of suitability is provided above using a suitability factor (f).

As shown in FIG. 2, another method 200 of the present invention is similar to method 100 except that the matching or associating step 220 may be performed such that a quality of water that is constituent in the respective root commodity meets (or in other preferred embodiments is otherwise related to) water quality standards of the respective water quality category. It should be understood that in any method (or system) of the present invention, there is no limit to the number of root commodities that are used to derive the current price of the fresh water of a particular quality category and/or grade.

As shown in FIG. 3, the present invention may be described as a method 800 of using financial instruments to invest in fresh water based of water quality. Method 800 may have a step 810 of determining, using a computer processor, a price of each of the financial instruments identifying on its face a particular amount of fresh water of a particular water quality category, the price of each financial instrument determined using an index value of fresh water of a particular water quality category. Step 820 may be having a computer store water quality standards for a plurality of water quality categories. Method 800 may have additional steps that are similar to methods 100 or 200 or 400 (or in other embodiments to the steps performed by the computer in systems 300 or 600). For example, method 800 may have a step 830 of determining, using a computer processor, current prices of at least one root commodity, the root commodities being other than water, each root commodity in the at least one root commodity having at least one of (i) water as a constituent in said each root commodity and (ii) water utilized in production of said each root commodity. Step 840 may be associating each water quality category of the at least one water quality category with a root commodity of the least one root commodity. The associating or matching may be such that a quality of water either (i) constituent in a respective root commodity and/or (ii) used in production of the respective root commodity, meets (or in other embodiments is related to) water quality standards of the respective water quality category. Step 850 may be determining, using a computer processor, for each water quality category of the at least one water quality category, the index value for fresh water meeting said each water quality category, the index value determined based on a current price of said each root commodity associated with said each water quality category and based on at least one of (i) a quantity of fresh water constituent in said each root commodity associated with said each water quality category and (ii) a quantity of fresh water used in production of said each root commodity associated with said each water quality category.

Method 800 may, in some preferred embodiments, have a step of displaying on a first portion of a display (such as the display 330 shown in FIG. 5A) associated with a computer processor at least one of the index values for fresh water, the display also displaying on a second portion of the display (or in some embodiments also on the first portion of the display) a price of at least one root commodity from which the at least one of the index values is derived, the at least one of the index values and the price of the at least one root commodity each being updated over time. In some preferred embodiments, a user looking at display 330 could discern changes in a price index of at least one root commodity followed by changes in a price index of at least one water quality category or grade within such water quality category such that the changes in the price index of the at least one water quality category may appear to be related to changes in the price index of the at least one root commodity.

In any of the methods 100, 200 or 800, or systems 300, 600, the water quality categories may have standards specifying ranges for at least one of, at least two of, at least three of, at least four of, at least five of or at least any other number of or all of the following: TDS, carbonate content, pH, hardness, sodium, chloride, nitrate, toxins and sodium adsorption ratio.

Figure 6A:
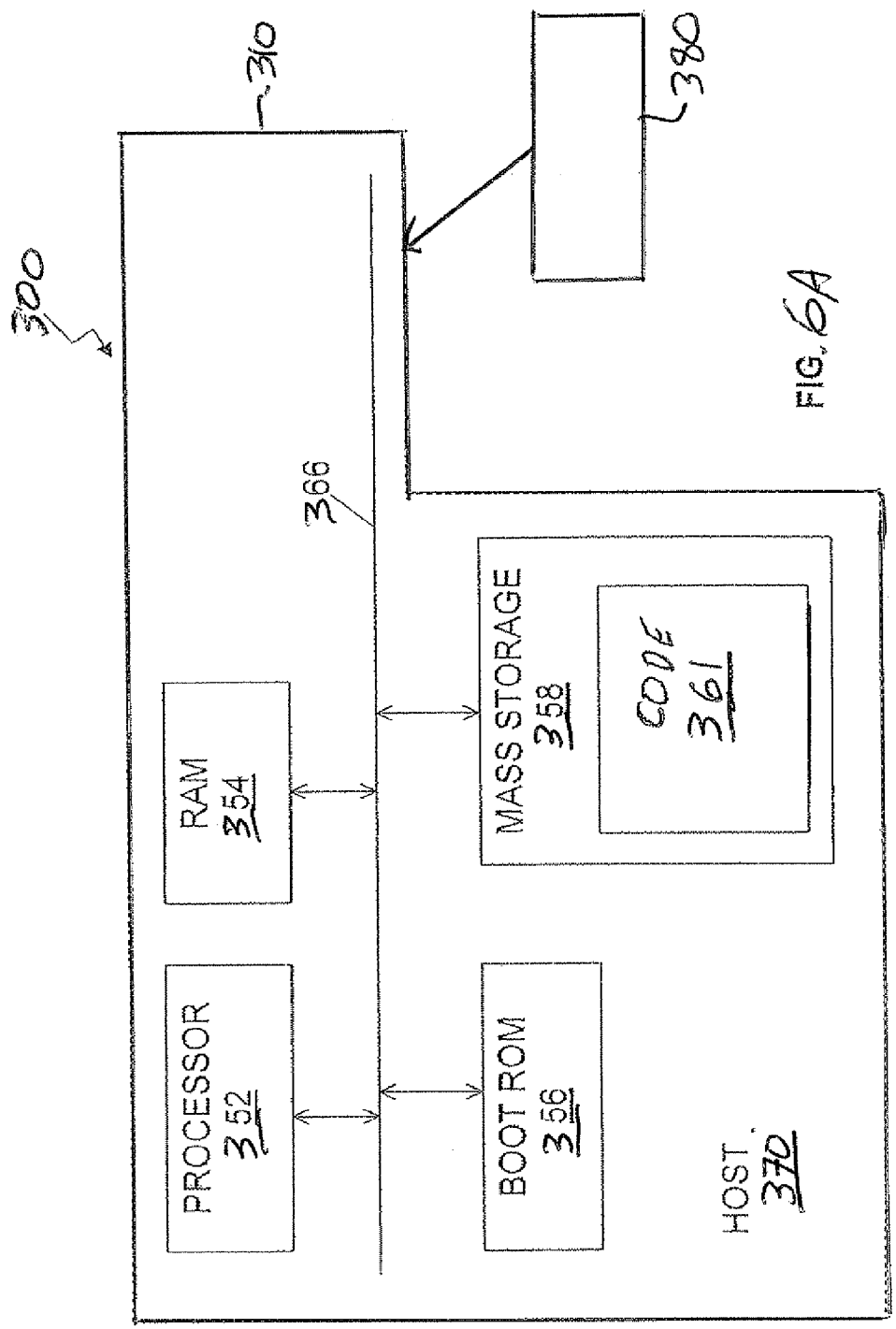
FIG. 6A is a schematic illustration of a system of the present invention in accordance with one embodiment of the present invention.

As seen by the high-level block diagram of FIG. 6A, a system 300 of the present invention may include a computer processor 352 and may have multiple computer memory devices such as a RAM 354, a boot ROM 356, a mass storage device 358 such as a hard disk 358. The memory devices may communicate to the processor 352 through a bus 66 and may communicate to each other through a common bus 366. Computer-readable program code 361 may be stored in a memory device such as mass storage device 58 and may be executed by processor 352 to access the memory device. Mass storage device 358 is an example of a non-transitory computer readable storage medium having computer-readable code for implementing the data storage methodology described.

Figure 6B:
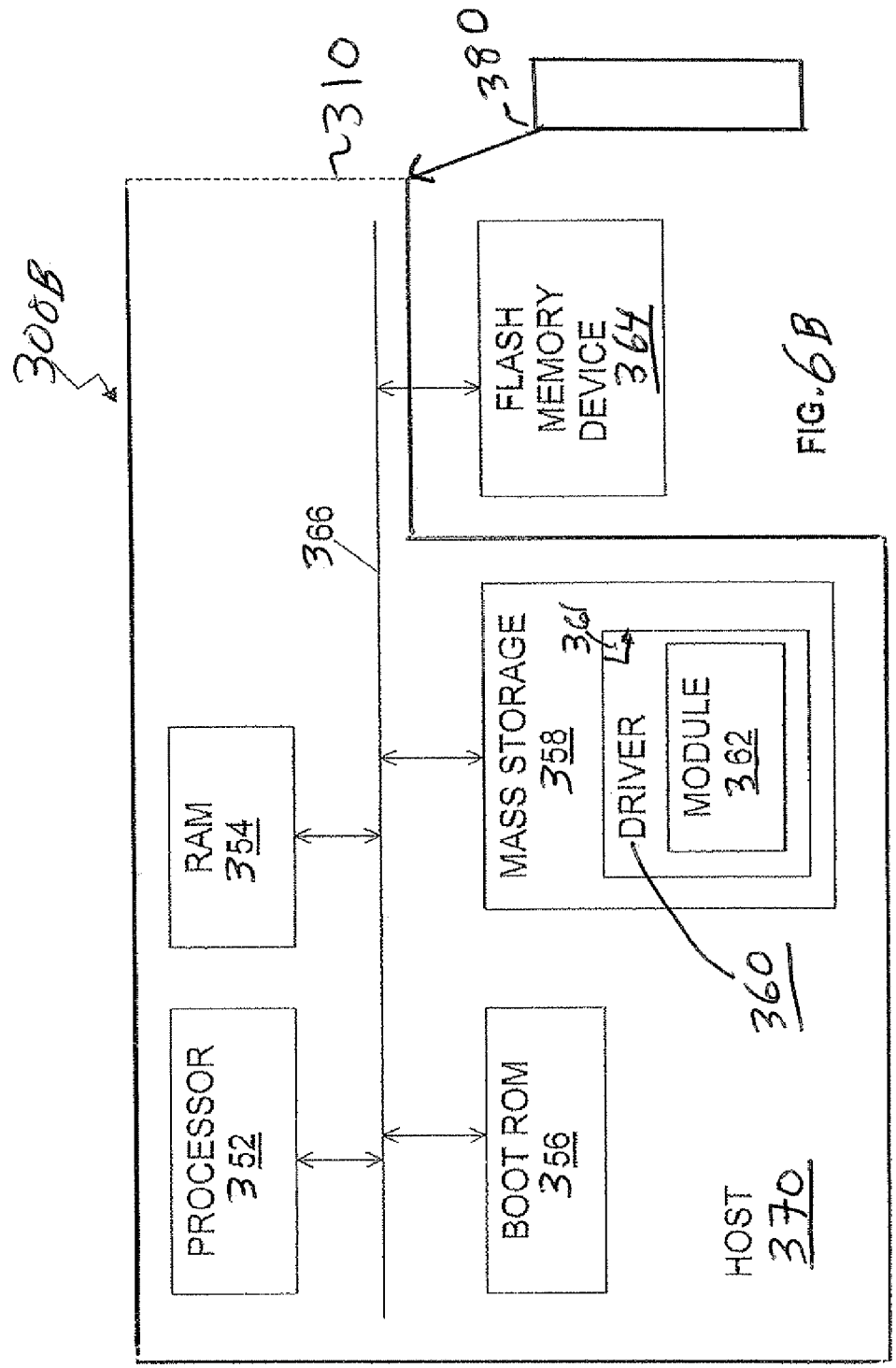
FIG. 6B is a schematic illustration of a system of the present invention in accordance with one embodiment of the present invention.

As seen by the high-level block diagram of FIG. 6B, system 300B of the present invention, system 300B may include a computer 310 having a computer processor 352 and multiple computer memory devices such as a RAM 354, a boot ROM 356, a hard disk 358 for mass storage and a flash memory device 364 known in the art. The memory devices may communicate to the processor 352 through a bus 366 and may communicate to each other through a common bus 366. A software driver 360 of a memory device such as flash memory device 64 may be stored in mass storage device 358 and may be executed by processor 352 to access the memory device such as flash memory device 364. Driver 360 may include a module 362 for encoding data to be stored in the memory device such as flash memory device 364 and for decoding codewords received from of the memory device such as lash memory device 364. The components of the system 300B other than the flash memory device 364 may comprise a host 370 of flash memory device 364, which may be computer 310. Mass storage device 358 is an example of a non-transitory computer readable storage medium having computer-readable code 61 for implementing the data storage methodology described.

The computer-readable program code 361 of FIG. 6A (or of FIG. 6B) may be embedded in a non-transitory computer readable medium and may be executed by processor 352. The program code 61 may comprise program code for executing any of the several processing functions to be described.

FIG. 6A schematically depicts a system 300. FIG. 6B schematically depicts a similar system 300B but one that includes flash memory drive. Each of system 300A, 300B may be for trading fresh water based on water quality, may comprise a computer 310 that may include a processor 352, may be linked to any or all of the multiple computer memory storage devices mentioned above (i.e. 354, 356 (or also flash memory drive 364 in the case of system 300B seen in FIG. 6B) and may have software 361 for operation of computer 310. Computer 310 and/or the program code 361 may comprise program code for determining current prices of at least one or a plurality of root commodities, the root commodities being other than water, each root commodity in the plurality of root commodities having at least one of (i) water as a constituent in the root commodity and (ii) water utilized in production of the root commodity.

Computer 310 and/or the program code 361 may comprise program code for storing water quality standards for at least one or a plurality of water quality categories.

Computer 310 and/or the program code 361 may comprise program code for processing associations between each of at least one water quality category with at least one root commodity. Processing associations may comprise determining associations from data provided and/or may include storing associations for further application. Computer 310 and/or program code 361 may include (or be linked or associated with) a memory storage device (i.e. 354, 356, 358 (and also flash memory storage 364 in the case of system 300B) to store these associations between each of at least one water quality category with at least one root commodity. The associations may be such that a quality of water that is either (or both) (i) used in production of the root commodity or (ii) that is a constituent of the root commodity, meets (or in other embodiments is otherwise related to) water quality standards of the respective water quality category. If the determining of the associations is not performed by the computer then the computer may only store the associations and apply them.

Computer 310 and/or the program code 361 may also include program code for determining a current index value for fresh water of each of the water quality categories based on a current price of said each root commodity and based on at least one of (i) a quantity of fresh water constituent in the root commodity associated with said each water quality category and (ii) a quantity of fresh water used in production of the root commodity.

System 300 may also include a water quality measuring device 380 or measuring fresh water of at least one water source (that has fresh water) with respect to at least one of TDS, carbonate content, pH, hardness, sodium, chloride, nitrate, toxins and sodium adsorption ratio to categorize the fresh water of the at least one water source by water quality category and/or to categorize the fresh water of the at least one water source by water quality grade within a water quality category of the fresh water of the at least one water source. The water quality measuring device 380 may comprise a device for measuring at least one of TDS, carbonate content, pH, hardness, sodium, chloride, nitrate, toxins and sodium adsorption ratio. In preferred embodiments, the water measuring device 380 (as well 680 of system 600) may include more than one water measuring devices and/or may be configured to measure at least two, at least three, at least four, at least five, at least six, at least, a majority, and preferably all of the above-mentioned physical or chemical criteria (TDS, carbonate content, pH. Harness, sodium chloride, nitrate, toxins and SAR).

Computer 310 may be configured to receive data from water quality measuring device, or from a computer or other device that stores such data and to compare the received data against stored water quality standards to determine a water quality category and/or water quality grade for the fresh water.

System 300 (as well as any of the other systems of the present invention such as systems 300B, 600, 700) may also include a financial instrument (shown as 340 in Shirazi '239 patent FIG. 1), such as a certificate 106 (see, e.g. Shirazi '239 patent FIG. 1) or a bond, a share, a stock, a future, reciting on its face a quantity of fresh water (and/or an index value or price for fresh water of a particular quality category). The memory devices of system 300 may also be for storing one or more index values for fresh water of each water quality category.

As shown in FIG. 5A, system 300 may further comprise a display 330 associated with the computer 310 for displaying an independent variable on a first portion 331 of the display 330 such as at least one 333 of the current index values for fresh water and a name or indicia 334 (i.e. "water B3") identifying the commodity as water and/or the category of fresh water whose current index value is displayed on the first portion, the display also displaying on a second portion 332 of the display 330 (or in some embodiments also on the first portion of the display) a dependent variable such as a current price 338 of at least one root commodity from which the at least one of the current index values is derived and a name or an indicia 339 (i.e. "com") identifying a root commodity (and preferably each such root commodity) whose current price is displayed on the second portion. In some preferred embodiments, a user looking at display 330 is able to see changes in a price index of at least one root commodity (which may be an independent variable) followed by changes in a price index of fresh water that is of at least one water quality category and/or water quality grade (within a water quality category) (which may be a dependent variable) such that the changes in the price index of the at least one water quality category may appear to be related to changes in the price index of the at least one root commodity. As stated, a numerically significant change in the independent variable may result in a visible change of at least one digit in the dependent variable. Although FIG. 5A displays the independent variable and the dependent variable in different portions, in other preferred embodiments, the independent variable and the dependent variable are displayed in the same portion of the display.

In some preferred embodiments of the display for system 300 (or for system 300B or 600) the system (300, 300B or 600) includes a display 330B (as shown in FIG. 5B) associated with a computer for displaying an updateable current price of one or more root commodities and an updateable current price of fresh water of a particular (i) water quality category, (ii) water quality grade or (iii) water quality category and water quality grade, such that the current price of the fresh water of the particular water quality is dependent on the current price of the one or more root commodities. As shown in FIG. 5B, in some preferred embodiments of the present invention the displayed prices of the at least one root commodity 338B and of the current prices of the fresh water 333B are situated in the same portion 332B of the display 330B.

In another characterization of the display 330 (or 330B) associated with the computer of the system 300 or 600, the display is for displaying one or more of the current index values for fresh water and an indicia identifying either water or a category of fresh water for each one of the current index value displayed on the first portion, the display also displaying a current price of at least one root commodity from which the at least one of the current index values is derived and an indicia identifying each of the at least one root commodity whose current price is displayed on the display.

The at least one water quality category may include one or two or three from the following categories (i) a first water quality category for water that meets minimal standards for either drinking or domestic use, (ii) a second water quality category for water that does not meet standards for drinking water but meets minimal standards for agricultural quality water and (iii) a third water quality category for water that does not meet standards for agricultural quality water or drinking water but meets minimal standards for industrial quality water. If the first water category is broken down into two water quality categories, namely drinking and domestic, then the water quality categories of system 300 (and of method 100 or method 200 or system 600) may include at least one or at least two or three or four of the four water quality categories (or at least a plurality or majority or some other specific number of categories plus any subcategories referred to as water quality grades). Moreover, water from icebergs may be viewed as a subcategory of drinking water in any method or system of the present invention.

The water quality standards used in the water quality categories and/or grades in any method or system of the present invention may specify ranges for at least one of (or at least two or at least three or four or five or any other plurality or majority or all of the following physical and/or chemical criteria or yardsticks): TDS, carbonate content, pH, hardness, sodium, chloride, nitrate, toxins and sodium adsorption ratio. Examples of the specific ranges are provided in Tables 1 through 5 herein.

Computer 310 of system 300 may in some preferred embodiments also determine, using its processor, a price of fresh water derived from a particular water source (or a specific amount of water being sold) by determining a current level of suitability of that fresh water for each of at least one water quality category and/or grades or at least two water quality categories (and/or grades) and by then mathematically combining all of the current index values of the fresh water of each water quality categories (and/or grade) together, for example by weighting each index value being combined by (i) the determined current level of suitability of the fresh water being priced (i.e. water from the particular water source or the specific quantity of water being sold) for each of the at least one (or at least two, at least three, etc.) water quality categories and by (ii) a market share of water from each water quality category (and/or water quality grade) of the at least one water quality category. The determination of the current level of suitability may be updated on a regular basis such as daily, weekly, monthly, annually, hourly, each minute or at any other reasonable time interval. This determination of the current level of suitability may also apply to system 600.

Figure 7:
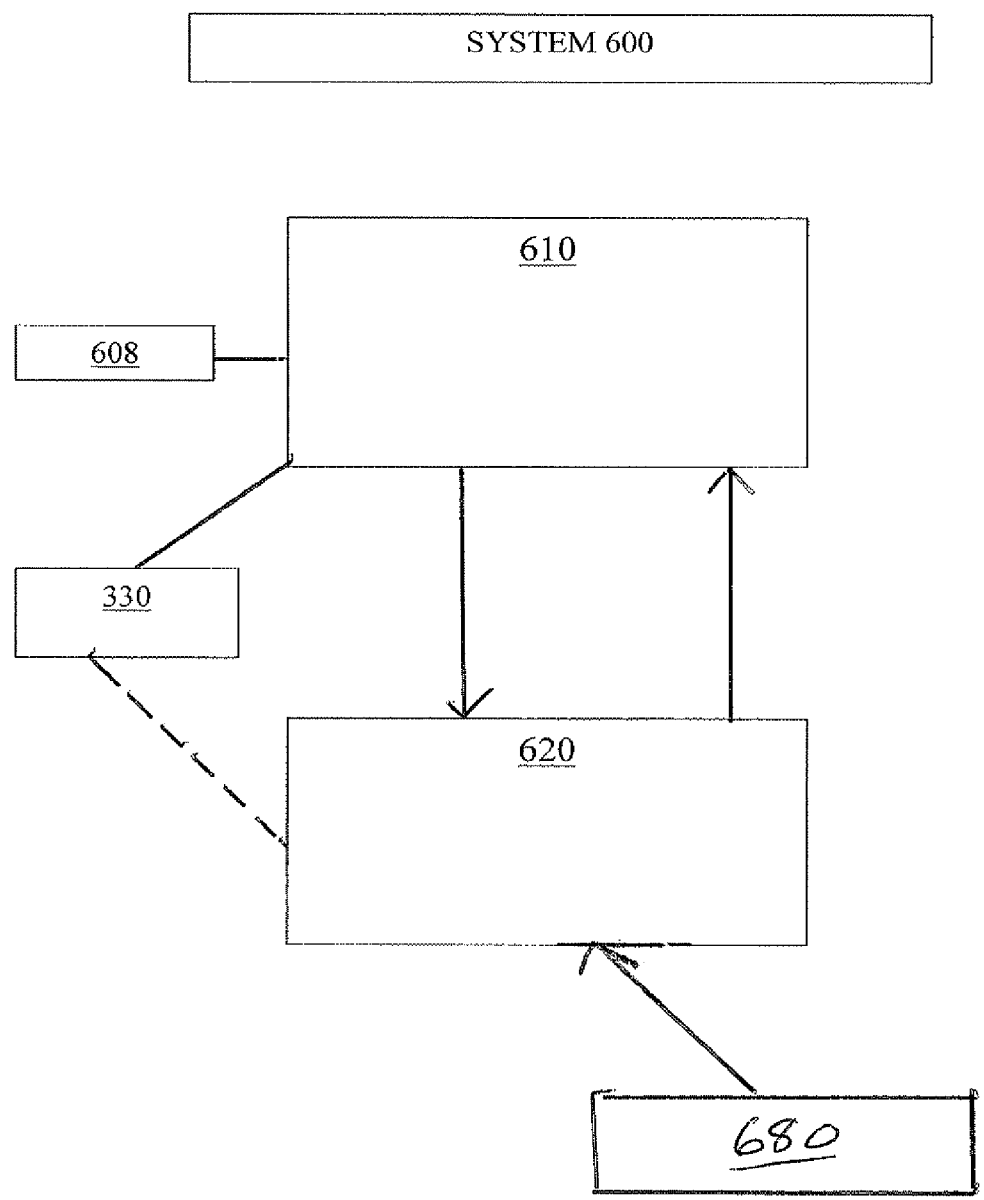
FIG. 7 is a schematic illustration of a further system of the present invention in accordance with one embodiment of the present invention.

A further embodiment of the present invention shown in FIG. 7 is a system 600 for trading fresh water based on water quality. System 600 may comprise at least one computer 610 of at least one commodities exchange 60S outputting prices of various commodities and in particular various commodities that are not water. At least one of these commodities may be a root commodity that either has fresh water as a constituent or whose production utilizes fresh water or both. To take one simple example of a root commodity, corn may be a root commodity since it contains water and independently since it utilizes water in it production.

Instead of a commodities exchange any other source of updateable current information on commodities prices that is linked to a computer may be used. An example of this is a web site having commodities prices linked to a server computer.

System 600 may also include a system computer 620 having the hardware and software elements shown in FIGS. 6A-6B for systems 300 and 300B. For example, system computer 620 may have a processor 622, one or more memory storage devices 624 linked to the processor 622 and code for operating the system computer 620. The system computer 620 may be linked (for example by a telecommunications link) with, and may be configured to receive from, the at least one computer 610 of the at least one commodities exchange updateable price data for the commodities. The system computer 620 may be configured to identify root commodities and extract, from the updateable price data, the current price for the identified root commodities. In addition, the system computer 620 and/or processor 622 may also configured to or programmed to (a) store water quality standards for at least one of or at least two of (or at least three of etc.) water quality categories and/or grades, (b) process associations (i.e. determine and/or store associations) between each of at least one of the water quality categories (and/or grades) in the at least one (or at least two, etc.) water quality category with at least one identified root commodity of the at least one identified root commodities such that a quality of water used in production (and/or that is constituent in the identified root commodity) of the identified root commodity meets (or in some preferred embodiments is related to) water quality standards of the respective water quality category.

(c) compute, for each water quality category of the at least one water quality category, a current index value for fresh water meeting said each water quality category, the current index value determined based on a current price of said each identified root commodity associated with said each water quality category and based on at least one of (i) a quantity of fresh water constituent in said each identified root commodity associated with said each water quality category and (ii) a quantity of fresh water used in production of said each identified root commodity associated with said each water quality category. Processor 622 may also be programmed to compute the current index value by reference to a market share of respective water sales in respective water quality qualities (and/or grades) and/or by reference to a market share of various root commodities.

The system computer 620 may be configured to transmit the computed current index value of each water quality category to the at least one computer 610. As shown by the arrows in FIG. 7, this may complete a data cycle that may include a first leg running from the at least one computer 610 to the system computer 620 and a return leg or second leg running from the system computer 620 to the at least one computer 610. The data cycle may involve extracting commodity price data from computer 610 and returning prices of water, for example prices based on water quality, from system computer 620 to the at least one computer 610.

System 600 may also include a water quality measuring device 680 for measuring fresh water of at least one water source with respect to at least one of TDS, carbonate content, pH, hardness, sodium, chloride, nitrate, toxins and sodium adsorption ratio to categorize the fresh water of the at least one water source by water quality category and/or to categorize the fresh water of the at least one water source by water quality grade within a water quality category of the fresh water of the at least one water source. System computer 620 may be configured to receive data from water quality measuring device 680, or from a computer or other device that stores such data and to compare the received data against stored water quality standards to determine a water quality category and/or water quality grade for the fresh water.

As shown in FIG. 7, system 600 may also include a display 630 (of the kind shown in FIG. 5A for example) associated with the at least one computer 610. The "association" may allow feeding and displaying of updated current prices in real time. The prices or indices of the independent variable and of the dependent variable may be updated at intervals of months, weeks, days, hours, minutes, seconds or any other reasonable interval. The display 330 may have a first portion 331 and a second display portion 332. Display 330 may display at least one current index value for fresh water of a water quality category and/or grade in first portion 331 of the display which may be updated over time and may display prices of identified root commodities from which the at least one current index value for fresh water is derived on second portion 332 of the display which may be updated over time. In one example shown in FIG. 5A, there are two adjacent and moving areas of the display, such as "ticker tapes", one showing prices and names of root commodities and one showing prices and names of water commodities, i.e. fresh water of a particular grade or water quality category. A viewer may be able to observe both portions of display 330 and may be able to observe that as the prices of the underlying root commodities changes, there is a change in the price of a related or associated water index, i.e. a water index whose price is derived from such root commodity as computed by a processor using factors, relationships, algorithms, calculations, functions and/or methods described in this patent application.

Alternatively, as shown by the dashed lines in FIG. 7, the display 330 may be associated with system computer 620 rather than the at least one computer 610 or may be associated with both of them (610, 620).

Figure 8:
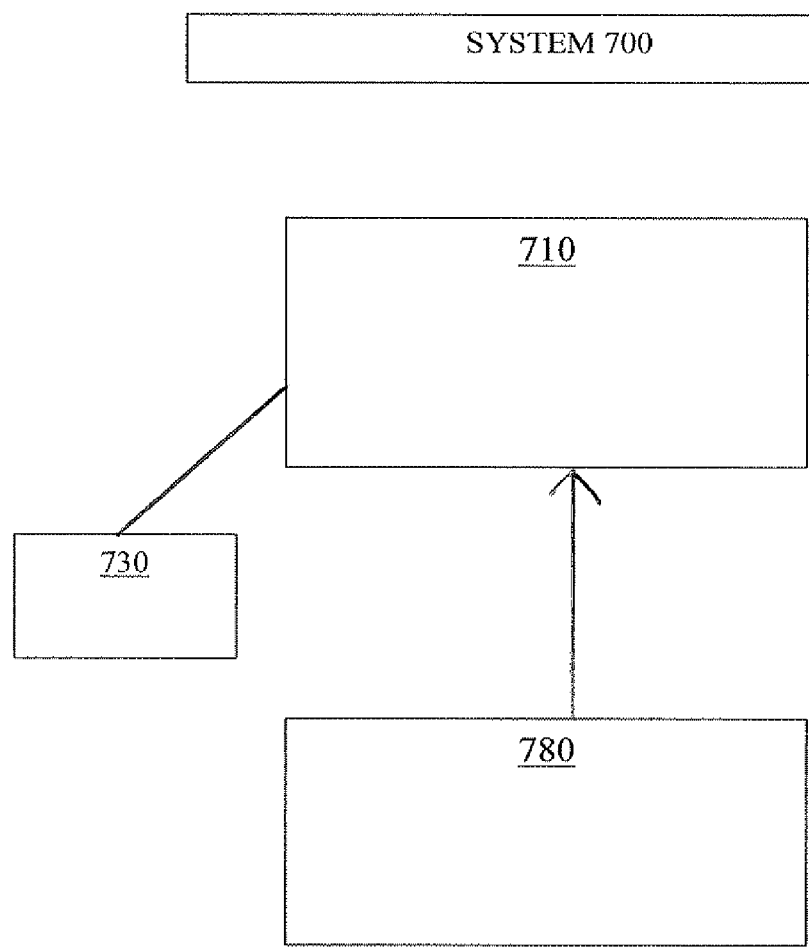
FIG. 8 is a schematic illustration of a further system of the present invention.

As shown by FIG. 8, tire present invention may also be described as a system 700 for trading fresh water based on water quality. System 700 may comprise a water quality measuring device 780 for measuring fresh water of at least one water source with respect to at least one of TDS, carbonate content, pH, hardness, sodium, chloride, nitrate, toxins and sodium adsorption ratio. System 700 may also include a computer having the components described with respect to systems 300, 300B (processor, memory etc.). As exemplified by the arrow in FIG. 8, the results or data ascertained by the device 780 may be transmitted to a computer 710 for storage and processing. Specifically, computer 710 may be configured to receive data from the water quality measuring device with respect to the fresh water in regard to the at least one of TDS, carbonate content, pH, hardness, sodium, chloride, nitrate, toxins and sodium adsorption ratio and for comparing the received data to stored water quality standards to determine a water quality category for the fresh water.

Computer 710 may also be (and may have programming instructions in code) for determining current prices of at least one root commodity that is other than water, each root commodity of the at least one root commodity having at least one of (i) water as a constituent in the root commodity and (ii) water utilized in production of the root commodity, for processing associations between each of at least one water quality category and at least one root commodity; and for determining a current index value for fresh water of each water quality category of the at least one water quality categories based on a current price of said each root commodity and based on at least one of (i) a quantity of fresh water constituent in the root commodity associated with said each water quality category and (ii) a quantity of fresh water used in production of the root commodity.

In some embodiments of system 700, computer 710 may also be for determining a water quality grade, and for processing associations between each of at least one water quality grade with the at least one root commodity; and determining a current index value for fresh water of each water quality grade based on a current price of said each root commodity and based on at least one of (i) a quantity of fresh water constituent in the root commodity associated with said each water quality grade and (ii) a quantity of fresh water used in production of the root commodity. System 700 may also include a display 730 associated with computer 710, for example a display 730 similar to the display shown in FIG. 5A or FIG. 5B, and may have the features described in relation to the display of the previously described methods and/or systems of the present invention. For example, display 730 may display both an independent variable (i.e. updateable current prices of at least one root commodity) and a dependent variable (updateable current prices of fresh water of a particular water quality category and/or water quality grade. The fresh water whose price may comprise the dependent variable may be a constituent of and/or may be utilized in the production of at least one of the root commodities whose price may comprise the independent variable or variables.

In any of the systems or methods of the present invention, a computer processor may use one or more mathematical operations to mathematically combine factors such as a quantity of fresh water constituent in a root commodity, a quality of fresh water utilized in production of a root commodity, a price of a root commodity, a market share (market weight) of fresh water of a particular water quality category and/or grade within a total market of fresh water, a suitability factor, a base price of water, an adjustment factor, a market share of one or more particular root commodities out of a total market of all relevant root commodities, a quantity of fresh water in a particular collateral, a quantity of fresh water described on the face of a financial instrument or other factors. Any of these factors may be updated regularly at reasonable intervals as necessary and if possible and appropriate in real time. Prices of root commodities, for example, may be updated in real time from a commodities exchange (see 608 in FIG. 7). Data for determining market shares and prices of products may come from publicly available statistics, for example information available over the Internet (for example statistics may be acquired from web sites associated with commodities markets, futures markets, stock exchanges (for example at N.Y., Chicago, London, Tokyo) and therefore can be updated easily in real time. Alternatively, statistics may be updated from periodically from published statistics or from statistics released from a government agency.

Any of the commodities referred to herein may be publicly traded commodities.

As seen from FIG. 4, the present invention may be described as a method 400 for investing in fresh water based on a quality of the fresh water. Method 400 may comprise a step 410 of determining, using a computer processor, current prices of one or more (or of two or more or three or more, etc.) root commodities, the root commodities being other than water, each root commodity in the at least one or (or at least two etc) root commodities having at least one of (i) water as a constituent in said each root commodity and (ii) water utilized in production of said each root commodity. Step 420 may involve matching each of at least one water quality category and/or water quality grade in the at least one water quality category and/or grade with at least one root commodity of the at least one (or at least two, etc) root commodity. Step 430 may comprise determining, using a computer processor, for each water quality category (and/or grade) of the at least one water quality category, a current index value for fresh water meeting said each water quality category, the index value determined based on a current price of said each root commodity that was matched with said each water quality category and based on at least one of (i) a quantity of fresh water constituent in said each root commodity that was matched with said each water quality category and (ii) a quantity of fresh water used in production of said each root commodity that was matched with said each water quality category. The computer processor involved in method 400 (as well as the processor of methods 100, 200 and 800) may be the processor 352 shown in FIGS. 6A and 6B for systems 300A and 300B.

A further step of method 400 may involve using a processor to determine an adjusted current index value by adjusting the price of pristine water based on a suitability of the pristine water for two or three of the following: (i) drinking, (ii) agricultural use and (iii) industrial use as shown in Table 7a and Table 9a. If the water is non-pristine water, then a further step may involve adjusting, using a processor, the price of non-pristine water based on a suitability of the non-pristine water for at least one (or in other preferred embodiments at least two) of (i) drinking, (ii) agricultural use and (iii) industrial use as shown in Table 8b and Table 10b to determine an adjusted current index value.

As with other methods, there may be a further step in method 400 of displaying on a first portion of a display (such as the display 330 shown in FIG. 5A) associated with a computer (such as computer 310 shown in FIG. 5, FIG. 6A, 6B) at least one of the adjusted current index values for fresh water and an indicia (i.e. "water B1") identifying either water as the commodity and/or the category of fresh water whose adjusted current index value is displayed on the first portion, the display also displaying on a second portion of the display a current price of at least one root commodity (i.e. "corn") from which the at least one of the current index values is derived and an indicia identifying a root commodity (preferably each soot commodity) whose current price is displayed on the second portion. Furthermore, the steps of method 400 may be added to step 210 (or steps 210 and 220) of method 200 involving financial instruments. In some other preferred embodiments of method 400, the display may show the updateable current price of the fresh water (the dependent variable) based on quality and the updateable current price of the at least one root commodity (independent variable) in the same portion of the display.

Method 400 may also have an additional step of determining, using a computer processor, a price of each of a plurality of financial instruments identifying on its face a particular amount of fresh water of a particular water quality category, the price of each financial instrument determined using the current index value of fresh water for one water quality category.

Similarly, systems 300, 600 may be modified so that the steps performed by computer 310 and/or code 361 in system 300 may correspond to steps of any of the methods described herein.

Furthermore, in any of the methods of systems described herein, the price of the water may be adjusted may be the geographical location of the source of water. Adjustment factors for geography may be stored in computer 310.

It should be emphasized, moreover, that any of the methods or systems described above may be modified to incorporate any of the elements or method steps described in the Shirazi '239 patent incorporated herein. Purely as an example, a system may include collateral configured to act as collateral for the financial instrument described herein. The collateral may be a large body of fresh water owned by a municipality and the collateral may be fresh water from a lake for example. Alternatively, the collateral may be a large amount of fresh water stored somewhere after being removed from a water source. Alternatively, the collateral may be water or ice from an iceberg, or from part of the iceberg. In addition, a broker may be involved in using any of the standardized price indices described herein. In some embodiments, current prices of fresh water of a particular water quality category and/or grade may be stored in a memory of a desktop or other computer of a broker and may be calculated by the processor of the computer.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A method of providing water of different water quality categories, the method comprising:
   determining, using one or more processors, a first index value based at least in part on a first water quality of a first source or designated quantity of water, wherein the first water quality is defined by (i) a water quality category or (ii) a water quality category and a grade within the water quality category,
   transporting a defined quantity of drinkable water of the first water quality that has an amount of the following chemical ingredients somewhere in the following range (i) TDS and (ii) $H_2CO_3$ or carbonate: TDS<50 mg/l, 30<$H_2CO_3$ or carbonate<250 mg/l, and has a pH in a range of 5-10, for sale at the first index value, the quantity of drinkable water of the first water quality labeled so as to identify the first water quality,
   determining, using the one or more processors, a second index value based at least in part on a second water quality of a second source or designated quantity of water, wherein the second water quality is defined by (i) a water quality category or (ii) a water quality category and a grade within the water quality category,
   transporting a defined quantity of drinkable water of the second water quality that has an amount of the following chemical ingredients somewhere in the following range (i) TDS and (ii) $H_2CO_3$ or carbonate: TDS<150 mg/l, $H_2CO_3$ or carbonate<400 mg/l, and has a pH in a range of 5-10, for sale at the second index value, the quantity of drinkable water of the second water quality labeled so as to identify the second water quality,
   wherein each of the drinkable water of the first water quality and the drinkable water of the second water quality is water that is recommended for drinking.

2. The method of claim 1, wherein the first water quality is defined by a water quality category and grades within the water quality category, wherein the grades include a best grade, a second best grade and a third best grade.

3. The method of claim 1, further comprising determining, using the one or more processors, the first index value based also on a geographical region or location of the first source or designated quantity of water.

4. The method of claim 3, wherein the first water quality is defined by a water quality category and grades within the water quality category, wherein the grades include a best grade, a second best grade and a third best grade.

5. The method of claim 3, wherein the first water quality is defined by a water quality category and grades within the water quality category, wherein the grades include a best grade for a particular geographic region or location of the first source or designated quantity of water, a second best grade for the geographic region or location of the first source or designated quantity of water and a third best grade for the geographic region or location of the first source or designated quantity of water.

6. The method of claim 1, further comprising using the quantity of drinkable water of the first water quality as collateral in trading water.

7. The method of claim 1, wherein the quantity of drinkable water of the first water quality also has an amount somewhere in the following ranges with respect to Na, Cl: Na<5 mg/l, Cl<20 mg/l and wherein the quantity of drinkable water of the second water quality also has the following ranges with respect to Na, Cl: Na<20 mg/l, Cl<300 mg/l.

8. The method of claim 1, further comprising
   transporting a defined quantity of drinkable water of a third water quality having the following ranges with respect to the following chemical ingredients (i) TDS and (ii) H2CO3 or carbonate: TDS<500 mg/l, $H_2CO_3$ or carbonate<500 mg/l for sale at a third index value,
   wherein the drinkable water of the third water quality is water that is recommended for drinking after treatment.

9. The method of claim 1, further comprising:
   transporting a defined quantity of pristine drinkable water of a first grade of water quality having first defined ranges with respect to the following chemical ingredients (i) TDS and (ii) H2CO3 or carbonate,
   wherein the pristine drinkable water is water that comes from a natural source that is recommended for drinking without treatment.

10. The method of claim 9, wherein the first grade is a medium grade and wherein the defined ranges with respect to the following chemical ingredients (i) TDS and (ii) H2CO3 or carbonate are:

TDS<3,500 mg/l
$H_2CO_3$ or carbonate<1500 mg/l.

11. The method of claim 1, further comprising transporting a defined quantity of agricultural water of a high water quality having the following ranges with respect to the following chemical ingredients (i) TDS and (ii) H2CO3 or carbonate: TDS<450 mg/l, H2CO3 or carbonate<75 mg/l, wherein the agricultural water of the high water quality is water that is used for agriculture.

12. The method of claim 11, further comprising transporting a defined quantity of agricultural water of a second water quality having the following ranges with respect to the following chemical ingredients (i) TDS and (ii) H2CO3 or carbonate: TDS<2000 mg/l, $H_2CO_3$ or carbonate<500 mg/l.

13. The method of claim 11, wherein a second grade of water quality is also defined by having second defined ranges with respect to the following chemical ingredients CaCO3.

14. The method of claim 1, wherein the first water quality is also defined by having the following range with respect to the following chemical ingredient: $CaCO_3$<100 mg/l and wherein the second water quality is also defined by having the following range with respect to the following chemical ingredient: $CaCO_3$<200 mg/l.

15. The method of claim 1, wherein the first water quality is also defined by having the following range with respect to the following chemical ingredient: $NO_3^-$<1 mg/l, wherein the second water quality is also defined by having the following range with respect to the following chemical ingredient: $NO_3$<5 mg/l.

16. A method of providing water of different water quality categories or grades, the method comprising:

measuring, using water quality measuring devices, a quality of a source of water or of a designated quantity of water for concentrations of (i) TDS and (ii) carbonate or carbonic acid, and for a level of pH in order to determine, or monitor, fitness of the source or designated quantity of water into particular water quality categories that include water for drinking or into grades of water quality within one of the particular water quality categories, determining, using one or more processors, a first index value based at least in part on a first water quality of the source or designated quantity of water and a varying property of at least one substance other than water, wherein the first water quality is defined by (i) a water quality category or (ii) a water quality category and a grade within the water quality category, transporting a defined quantity of industrial quality water of the first water quality that has an amount of the following chemical ingredients somewhere in the following range (i) TDS and (ii) $H_2CO_3$ or carbonate: TDS<150 mg/l, 30<$H_2CO_3$ or carbonate<250 mg/l, and has a pH in a range of 6.5-8, for sale at the first index value, the quantity of industrial quality water of the first water quality labeled so as to identify the first water quality, determining, using the one or more processors, a second index value based at least in part on a second water quality of the source or designated quantity of water and the varying property of the at least one substance, wherein the second water quality is defined by (i) a water quality category or (ii) a water quality category and a grade within the water quality category, transporting a defined quantity of industrial quality water of a second water quality that has an amount of the following chemical ingredients somewhere in the following range (i) TDS and (ii) $H_2CO_3$ or carbonate: TDS<350 mg/l, $H_2CO_3$ or carbonate<400 mg/l, and has a pH in a range of 6.5-8, for sale at the second index value, the quantity of industrial quality water of the second water quality labeled so as to identify the second water quality.

17. The method of claim 16, further comprising transporting a defined quantity of agricultural water of a high water quality having the following ranges with respect to the following chemical ingredients (i) TDS and (ii) $H_2CO_3$ or carbonate: TDS<450 mg/l, $H_2CO_3$ or carbonate<75 mg/l, wherein the agricultural water of the high water quality is water that is used for agriculture.

18. The method of claim 16, wherein the first water quality is defined by a water quality category and grades within the water quality category, wherein the grades include a best grade, a second best grade and a third best grade.

19. The method of claim 16, further comprising determining, using the one or more processors, the first index value based also on a geographical region or location of the first source or designated quantity of water.

20. The method of claim 19, wherein the first water quality is defined by a water quality category and grades within the water quality category, wherein the grades include a best grade, a second best grade and a third best grade.

21. The method of claim 19, wherein the first water quality is defined by a water quality category and grades within the water quality category, wherein the grades include a best grade for a particular geographic region or location of the first source or designated quantity of water, a second best grade for the geographic region or location of the first source or designated quantity of water and a third best grade for the geographic region or location of the first source or designated quantity of water.

22. The method of claim 16, further comprising using the quantity of drinkable water of the first water quality as collateral in trading water.

23. The method of claim 16, further comprising measuring, using water quality measuring devices, the quality of water in a collateral or a water asset.

24. A method of providing water of different water quality categories, the method comprising:

determining, using one or more processors, a first index value based at least in part on a first water quality of a first source or designated quantity of water, wherein the first water quality is defined by (i) a water quality category or (ii) a water quality category and a grade within the water quality category, transporting a defined quantity of agricultural water of the first water quality that has an amount of the following chemical ingredients somewhere in the following range (i) TDS and (ii) $H_2CO_3$ or carbonate: TDS<450 mg/l, 75<$H_2CO_3$ or carbonate, and has a pH in a range of 6.5-8.4, for sale at the first index value, the quantity of agricultural water of the first water quality labeled so as to identify the first water quality, determining, using the one or more processors, a second index value based at least in part on a second water quality of a second source or designated quantity of water, wherein the second water quality is defined by (i)

a water quality category or (ii) a water quality category and a grade within the water quality category, transporting a defined quantity of agricultural water of the second water quality that has an amount of the following chemical ingredients somewhere in the following range (i) TDS and (ii) $H_2CO_3$ or carbonate: TDS<2000 mg/l, $H_2CO_3$ or carbonate<500 mg/l, and has a pH in a range of 6.5-8.4, for sale at the second index value, the quantity of agricultural water of the second water quality labeled so as to identify the second water quality, wherein each of the agricultural water of the first water quality and the agricultural water of the second water quality is water that is fit for agriculture.

25. The method of claim 24, wherein the first water quality is defined by a water quality category and grades within the water quality category, wherein the grades include a best grade, a second best grade and a third best grade.

26. The method of claim 24, further comprising determining, using the one or more processors, the first index value based also on a geographical region or location of the first source or designated quantity of water.

27. The method of claim 26, wherein the first water quality is defined by a water quality category and grades within the water quality category, wherein the grades include a best grade, a second best grade and a third best grade.

28. The method of claim 26, wherein the first water quality is defined by a water quality category and grades within the water quality category, wherein the grades include a best grade for a particular geographic region or location of the first source or designated quantity of water, a second best grade for the geographic region or location of the first source or designated quantity of water and a third best grade for the geographic region or location of the first source or designated quantity of water.

29. The method of claim 24, further comprising using the quantity of agricultural water of the first water quality as collateral in trading water.

30. The method of claim 24, further comprising measuring, using water quality measuring devices, the quality of water in a collateral or a water asset.

31. A method of providing water of different water quality categories, the method comprising:

determining, using one or more processors, a first index value based at least in part on a first water quality of a first source or designated quantity of water, wherein the first water quality is defined by (i) a water quality category or (ii) a water quality category and a grade within the water quality category, transporting a defined quantity of industrial water of the first water quality that has an amount of the following chemical ingredients somewhere in the following range (i) TDS and (ii) $H_2CO_3$ or carbonate: TDS<150 mg/l, 30<$H_2CO_3$ or carbonate<250 mg/l, and has a pH in a range of 6.5-8, for sale at the first index value, the quantity of industrial water of the first water quality labeled so as to identify the first water quality, determining, using the one or more processors, a second index value based at least in part on a second water quality of a second source or designated quantity of water, wherein the second water quality is defined by (i) a water quality category or (ii) a water quality category and a grade within the water quality category, transporting a defined quantity of industrial water of the second water quality that has an amount of the following chemical ingredients somewhere in the following range (i) TDS and (ii) $H_2CO_3$ or carbonate: TDS<350 mg/l, $H_2CO_3$ or carbonate<400 mg/l, and has a pH in a range of 6.5-8, for sale at the second index value, the quantity of industrial water of the second water quality labeled so as to identify the second water quality, wherein each of the industrial water of the first water quality and the industrial water of the second water quality is water that is fit for industrial use.

32. The method of claim 31, wherein the first water quality is defined by a water quality category and grades within the water quality category, wherein the grades include a best grade, a second best grade and a third best grade.

33. The method of claim 31, further comprising determining, using the one or more processors, the first index value based also on a geographical region or location of the first source or designated quantity of water.

34. The method of claim 33, wherein the first water quality is defined by a water quality category and grades within the water quality category, wherein the grades include a best grade, a second best grade and a third best grade.

35. The method of claim 33, wherein the first water quality is defined by a water quality category and grades within the water quality category, wherein the grades include a best grade for a particular geographic region or location of the first source or designated quantity of water, a second best grade for the geographic region or location of the first source or designated quantity of water and a third best grade for the geographic region or location of the first source or designated quantity of water.

36. The method of claim 31, further comprising using the quantity of industrial water of the first water quality as collateral in trading water.

37. The method of claim 31, further comprising measuring, using water quality measuring devices, the quality of water in a collateral or a water asset.

38. A method of claim 9, wherein the pristine water is bottled water.

39. The method of claim 1, wherein the drinkable water of the first water quality is bottled water of a first grade and wherein the drinkable water of the second water quality is bottled water of a second grade.

40. The method of claim 1, wherein the drinkable water is derived from icebergs.

41. The method of claim 1, further comprising using the quantity of drinkable water of the first water quality derived from icebergs as collateral in trading water.

* * * * *